US012172329B2

(12) United States Patent
Caswell

(10) Patent No.: US 12,172,329 B2
(45) **Date of Patent: *Dec. 24, 2024**

(54) FOLDING KNIFE WITH LOCKING LINKAGE ASSEMBLY

(71) Applicant: GB II Corporation, Tualatin, OR (US)

(72) Inventor: Joseph Caswell, Newbury Park, CA (US)

(73) Assignee: GB II Corporation, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,690

(22) Filed: Feb. 22, 2022

(65) Prior Publication Data

US 2022/0176574 A1 Jun. 9, 2022

Related U.S. Application Data

(63) Continuation of application No. 16/527,820, filed on Jul. 31, 2019, now Pat. No. 11,285,626.

(60) Provisional application No. 62/715,650, filed on Aug. 7, 2018.

(51) Int. Cl.
*B26B 1/04* (2006.01)

(52) U.S. Cl.
CPC .................................... *B26B 1/042* (2013.01)

(58) Field of Classification Search
CPC .. B26B 1/00; B26B 1/042; B26B 1/10; B26B 1/04; F41B 13/00; F41B 13/08
See application file for complete search history.

(56) References Cited

U.S. PATENT DOCUMENTS

| | | | |
|---|---|---|---|
| 786,492 | A | 4/1905 | Garimaldi |
| 881,294 | A | 3/1908 | Billings |
| 947,980 | A | 2/1910 | Romano |
| 1,120,277 | A | 12/1914 | Carlson |

(Continued)

FOREIGN PATENT DOCUMENTS

| | | |
|---|---|---|
| CN | 103182715 B | 4/2016 |
| CN | 304492197 | 2/2018 |

(Continued)

OTHER PUBLICATIONS

Non-Final Office Action dated Jun. 11, 2021, issued for U.S. Appl. No. 16/527,820 (23 pages).

(Continued)

*Primary Examiner* — Jonathan G Riley
(74) *Attorney, Agent, or Firm* — Klarquist Sparkman, LLP

(57) ABSTRACT

A folding knife can include a handle comprising a side wall having a side surface, a protrusion extending laterally from the side surface of the side wall, a blade, and a linkage assembly pivotably coupling the handle to the blade. The protrusion can have an edge extending laterally from the side surface of the side wall to the side surface of the protrusion. The edge can include a first surface portion and a second surface portion configured as a locking surface. The second surface portion can extend downwardly at an angle relative to the first surface portion. The blade can have a tang including a locking edge, and can be translatable relative to the handle between a storage position and a use position. When the blade is in the use position, the locking surface engages the locking edge to resist movement of the blade in a first direction.

20 Claims, 10 Drawing Sheets

(56) References Cited

U.S. PATENT DOCUMENTS

| | | | | |
|---|---|---|---|---|
| 1,454,665 | A | 5/1923 | Bobek | |
| 1,505,386 | A | 8/1924 | Golding et al. | |
| 1,665,955 | A | 4/1928 | Gatewood | |
| 1,706,918 | A | 3/1929 | Erickson | |
| 1,743,022 | A | 1/1930 | Carman | |
| 1,918,708 | A | 7/1933 | Miller | |
| 1,984,623 | A | 12/1934 | Babin et al. | |
| 2,262,645 | A | 11/1941 | Newman | |
| 2,561,682 | A | 7/1951 | Barnett | |
| 3,316,635 | A | 5/1967 | Merrow et al. | |
| 3,863,339 | A | 2/1975 | Reaney et al. | |
| 4,068,375 | A | 1/1978 | Rathbun et al. | |
| 4,173,068 | A | 11/1979 | Cargill | |
| D270,655 | S | 9/1983 | Collins | |
| 4,404,748 | A | 9/1983 | Wiethoff | |
| 4,451,982 | A | 6/1984 | Collins | |
| 4,502,221 | A | 3/1985 | Pittman | |
| 4,612,706 | A | 9/1986 | Yunes | |
| 4,719,700 | A | 1/1988 | Taylor, Jr. | |
| 4,722,140 | A | 2/1988 | Miceli | |
| 4,776,094 | A | 10/1988 | Glesser | |
| 4,805,303 | A | 2/1989 | Gibbs | |
| 4,811,486 | A | 3/1989 | Cunningham | |
| 4,837,932 | A | 6/1989 | Elsener | |
| 4,893,409 | A | 1/1990 | Poehlmann | |
| 4,974,323 | A | 12/1990 | Cassady | |
| 4,979,301 | A | 12/1990 | Walker | |
| 5,044,079 | A | 9/1991 | Gibbs | |
| 5,060,379 | A | 10/1991 | Neely | |
| 5,095,624 | A | 3/1992 | Ennis | |
| 5,111,581 | A | 5/1992 | Collins | |
| 5,293,690 | A | 3/1994 | Cassady | |
| 5,325,588 | A | 6/1994 | Rinehart et al. | |
| 5,331,741 | A | 7/1994 | Taylor, Jr. | |
| 5,425,175 | A | 6/1995 | Rogers | |
| 5,426,855 | A | 6/1995 | Keklak et al. | |
| 5,502,895 | A | 4/1996 | Lemaire | |
| 5,515,610 | A | 5/1996 | Levin et al. | |
| 5,537,750 | A | 7/1996 | Seber et al. | |
| 5,546,662 | A | 8/1996 | Seber et al. | |
| 5,596,808 | A | 1/1997 | Lake et al. | |
| 5,615,484 | A | 4/1997 | Pittman | |
| 5,685,079 | A | 11/1997 | Brothers et al. | |
| 5,689,885 | A | 11/1997 | Walston | |
| 5,692,304 | A | 12/1997 | Campbell | |
| 5,737,841 | A | 4/1998 | McHenry et al. | |
| 5,755,035 | A | 5/1998 | Weatherly | |
| 5,802,722 | A | 9/1998 | Maxey et al. | |
| 5,815,927 | A | 10/1998 | Collins | |
| 5,822,866 | A | 10/1998 | Pardue | |
| 5,826,340 | A | 10/1998 | Hull | |
| 5,878,500 | A | 3/1999 | Emerson | |
| 5,887,347 | A | 3/1999 | Gibbs | |
| 5,964,036 | A | 10/1999 | Centofante | |
| 6,079,106 | A | 6/2000 | Vallotton | |
| 6,154,965 | A | 12/2000 | Sakai | |
| 6,195,898 | B1 | 3/2001 | Lemisch | |
| 6,338,431 | B1 | 1/2002 | Onion | |
| 6,378,214 | B1 | 4/2002 | Onion | |
| 6,427,335 | B1 | 8/2002 | Ralph | |
| 6,438,848 | B1 | 8/2002 | McHenry et al. | |
| 6,477,777 | B1 | 11/2002 | Oliveri | |
| 6,490,797 | B1 | 12/2002 | Lake et al. | |
| 6,594,906 | B1 | 7/2003 | Sakai et al. | |
| 6,722,969 | B2 | 4/2004 | Hendrickson | |
| 6,725,545 | B2 | 4/2004 | Frank | |
| D495,772 | S | 9/2004 | Hibben | |
| 6,898,858 | B1 | 5/2005 | Spell | |
| D510,009 | S | 9/2005 | Lee | |
| 6,941,661 | B2 * | 9/2005 | Frazer | B26B 1/048 30/160 |
| 7,036,229 | B1 | 5/2006 | Demko | |
| D553,467 | S | 10/2007 | Ryan | |
| D566,222 | S | 4/2008 | Hawk et al. | |
| D569,212 | S | 5/2008 | Hawk et al. | |
| 7,676,930 | B1 | 3/2010 | Demko | |
| 7,681,316 | B2 | 3/2010 | Hawk et al. | |
| 7,905,022 | B2 | 3/2011 | Hawk et al. | |
| 7,940,510 | B2 | 5/2011 | Krudo | |
| 8,296,958 | B1 * | 10/2012 | Frazer | B26B 1/042 30/158 |
| 8,353,109 | B2 | 1/2013 | Rohrbach | |
| 8,402,662 | B1 | 3/2013 | Douzanis | |
| 8,732,957 | B2 | 5/2014 | Rohrbach | |
| D713,923 | S | 9/2014 | Salvitti et al. | |
| 8,973,273 | B2 | 3/2015 | Brown et al. | |
| 9,174,347 | B2 | 11/2015 | Hongquan et al. | |
| D746,119 | S | 12/2015 | Pelton | |
| D746,120 | S | 12/2015 | Pelton | |
| 9,289,904 | B2 | 3/2016 | Hawk et al. | |
| D756,193 | S | 5/2016 | Horvath | |
| 9,751,221 | B1 | 9/2017 | Aylsworth | |
| 9,808,940 | B1 * | 11/2017 | Sakai | B26B 1/042 |
| 9,908,246 | B2 | 3/2018 | Frauenglass | |
| 10,189,169 | B2 | 1/2019 | Varner | |
| D865,480 | S | 11/2019 | Caswell | |
| 10,464,222 | B2 | 11/2019 | Frauenglass | |
| 10,737,400 | B2 | 8/2020 | Caswell | |
| D905,529 | S * | 12/2020 | Caswell | D8/99 |
| D925,325 | S | 7/2021 | Caswell | |
| 11,285,626 | B2 * | 3/2022 | Caswell | B26B 1/042 |
| 2002/0029481 | A1 | 3/2002 | Eickhorn | |
| 2002/0059730 | A1 | 5/2002 | Flavigny | |
| 2005/0150115 | A1 * | 7/2005 | Hanna | B26B 1/02 30/294 |
| 2006/0042098 | A1 | 3/2006 | Morales | |
| 2007/0124940 | A1 * | 6/2007 | Hawk | B26B 1/04 30/161 |
| 2009/0119929 | A1 | 5/2009 | Monnig et al. | |
| 2009/0302591 | A1 | 12/2009 | Auer et al. | |
| 2011/0035847 | A1 | 2/2011 | Kishore et al. | |
| 2011/0140389 | A1 | 6/2011 | Ellement | |
| 2013/0212886 | A1 | 8/2013 | Hawk et al. | |
| 2013/0247382 | A1 | 9/2013 | Hongquan et al. | |
| 2013/0327191 | A1 | 12/2013 | Wason | |
| 2014/0001425 | A1 | 1/2014 | Falcon | |
| 2014/0249546 | A1 | 9/2014 | Shvartsberg et al. | |
| 2016/0067801 | A1 | 3/2016 | Cheng | |
| 2016/0368154 | A1 | 12/2016 | Varner | |
| 2017/0165849 | A1 * | 6/2017 | DeBaker | B26B 1/044 |
| 2017/0210018 | A1 * | 7/2017 | Frauenglass | B26B 1/00 |
| 2018/0154531 | A1 * | 6/2018 | Caswell | B26B 1/10 |
| 2018/0169876 | A1 | 6/2018 | Frauenglass | |
| 2019/0202072 | A1 * | 7/2019 | Gariboldi | B26B 1/04 |
| 2020/0047357 | A1 | 2/2020 | Caswell | |
| 2020/0346356 | A1 * | 11/2020 | Caswell | B26B 1/00 |

FOREIGN PATENT DOCUMENTS

| | | | |
|---|---|---|---|
| CN | 207747078 | | 8/2018 |
| CN | 304815344 | | 9/2018 |
| CN | 305200534 | | 6/2019 |
| CN | 305220330 | | 6/2019 |
| DE | 102006047835 | B3 | 1/2008 |
| DE | 202015005079 | U1 | 10/2015 |
| DE | 102014012803 | A1 | 3/2016 |
| DE | 202017003187 | | 10/2017 |
| DE | 202017003187 | U1 * | 10/2017 |
| EP | 2 641 705 | A1 | 9/2013 |
| WO | WO2018/047077 | | 3/2018 |

OTHER PUBLICATIONS

Non-Final Office Action dated Aug. 19, 2021, issued for U.S. Appl. No. 16/934,564 (9 pages).

Final Office action dated Mar. 15, 2022, issued for U.S. Appl. No. 16/934,564 (21 pages).

Chinese Office Action with translation, dated Apr. 20, 2022, issued for Chinese Application No. 201910715870.X (25 pages).

Ex Parte Quayle Office Action dated Apr. 2, 2019, issued for U.S. Appl. No. 29/674,309 (10 pages).

(56) References Cited

OTHER PUBLICATIONS

Non-Final Office Action dated May 1, 2019, issued for U.S. Appl. No. 15/682,510 (18 pages).
Office action dated Jun. 19, 2020, issued by the Taiwan Intellectual Property Office in corresponding Taiwan Application No. 108308125, with English translation (8 pages).
Non-Final Office Action dated Nov. 27, 2020, issued for Design U.S. Appl. No. 29/714,036 (13 pages).
Non-Final Office Action dated Jun. 11, 2021, issued for U.S. Appl. No. 16/527,820 (33 pages).
"Caswell Knives," Instagram post <https://www.instagram.com/p/BH6AIdDgnD1/>, Jul. 15, 2016 (retrieved Sep. 2, 2021) (1 page).
"Caswell Knives," Instagram post <https://www.instagram.com/p/BIx_C6rgj1F/>, Aug. 6, 2016 (retrieved Sep. 2, 2021) (1 page).
"Caswell Knives," Instagram posts <https://www.instagram.com/caswellknives/>, Aug. 29, 2016 (retrieved Sep. 2, 2021) (3 pages).
Matthew West, *Four-Bar Linkages*, 2012.
Non-Final Office Action dated Jun. 20, 2023, issued for U.S. Appl. No. 18/057,091 (32 pages).

* cited by examiner

FOLDING KNIFE WITH LOCKING LINKAGE ASSEMBLY

CROSS-REFERENCE TO RELATED APPLICATIONS

This application is a continuation of U.S. application Ser. No. 16/527,820, filed Jul. 31, 2010 and also claims the benefit of U.S. Provisional Application No. 62/715,650, filed Aug. 7, 2018, which applications are incorporated herein by reference.

FIELD

The present disclosure relates generally to tools configured to be easily and quickly opened for use.

BACKGROUND

Folding knives are available in various configurations. In some of these configurations, the blade of a folding knife moves from a storage position to a use position by means of rotational movement of the blade. Typically, this is facilitated by a pivot located at one of two prominent ends of the handle around which the blade rotates. More recently, folding knives using linkage bar assemblies have been developed, such as disclosed in U.S. Patent Application Publication No. 2018/0154531, which is incorporated herein by reference in its entirety. The knife disclosed in the prior application includes a blade coupled to a handle by two linkages that move the blade between closed and open positions. A locking mechanism on the handle retains the blade in the open position. The present application is directed to improvements to folding knives that include such linkage bar assemblies and locking mechanisms for such knives.

SUMMARY

In one representative embodiment, a folding knife comprises a handle comprising a grasping portion, and a blade translatable relative to the handle between a storage position and a use position. The blade can comprise an opening at a tang portion of the blade, the opening comprising a first portion having a first width and a second portion having a second width, wherein the first width is greater than the second width. The knife can further comprise a first linking element and a second linking element. The first linking element is pivotably coupled to the handle at a first pivot axis and pivotably coupled to the blade at a second pivot axis extending through the opening in the blade. The second linking element is pivotably coupled to the handle at a third pivot axis and pivotably coupled to the blade at a fourth pivot axis. A protrusion can be coupled to and extend laterally from a surface of the first linking element. Wherein when the protrusion is disposed within the first portion of the opening of the blade, the protrusion can be rotated within the first portion of the opening and the blade can be moved from the storage position to the use position. Wherein when the blade is in the use position, the first linking element can be pivoted relative to the blade and the second linking element to a locked orientation in which the protrusion is received within the second portion of the opening in the blade and the first linking element engages the second linking element, thereby locking the blade in the use position.

In some embodiments, the handle can further comprise a blade stop extending from a surface of the handle and the blade can further comprise an extension portion disposed between the tang portion and a tip portion of the blade, wherein when the blade is in the use position, the extension portion contacts the blade stop.

In some embodiments, the folding knife can comprise a biasing element configured to bias the first linking element into the locked orientation.

In some embodiments, the first linking element can comprise an actuator, wherein the actuator can be actuated by a user to move the first linking element away from the locked orientation.

In some embodiments, the actuator is a thumb stud.

In some embodiments, the actuator is a lever.

In another representative embodiment, a folding knife comprises a handle comprising a grasping portion, a blade, a first linking element, and a second linking element. The first linking element is pivotably coupled to the handle at a first pivot axis and pivotably coupled to the blade at a second pivot axis. The second linking element is pivotably coupled to the handle at a third pivot axis and pivotably coupled to the blade at a fourth pivot axis. The blade is translatable relative to the handle via the first and second linking elements between a storage position and a use position. Wherein when the blade in the use position, the first linking element can be pivoted relative to the blade and the second linking element to a locked orientation in which the first linking element engages the second linking element, thereby locking the blade in the use position.

In some embodiments, the folding knife further can comprise a biasing element configured to bias the first linking element into the locked orientation.

In some embodiments, the first linking element can comprise an actuator, and the actuator can be actuated by a user to move the first linking element away from the locked orientation.

In still another representative embodiment, a folding knife comprises a blade having a tang portion, the blade being translatable between a storage position and a use position, a first linking element, a second linking element, and a handle. The first and second linking elements can be pivotably coupled to the tang portion at first and second pivot axes, respectively. The handle can be coupled to the first and second linking elements at third and fourth pivot axes, respectively. The handle can comprise a first locking surface configured to resist movement of the blade in a first direction, and a second locking surface configured to resist movement of the blade in an opposing second direction.

In some embodiments, when the blade is in the use position the first locking surface engages a first edge portion of the tang portion and the second locking surface engages a second edge portion of the tang portion. In some embodiments, the tang portion comprises a projection, and wherein the projection comprises the first edge portion.

In some embodiments, the handle can comprise a laterally extending protrusion having a surface portion and an edge portion, and wherein the edge portion comprises the first and second locking surfaces. In some embodiments, the edge portion of the laterally extending protrusion has a stepped shape comprising first and second longitudinally extending surfaces and first and second angled surfaces, the first and second angled surfaces comprising the first and second locking surfaces, respectively. In some embodiments, the protrusion comprises a blade guard and wherein when in the storage position a cutting edge of the blade is at least partially disposed within the blade guard.

In some embodiments, the knife further comprises a locking mechanism movable between a locked position, a detent position, and unlocked position, wherein when in the locked position the locking mechanism is configured to retain the blade in the use position. In some embodiments, when in the locked position the locking mechanism engages a rear end portion of the first linking element to resist movement of the first linking element in the second direction. In some embodiments, the rear end portion of the first linking element comprises a protrusion extending laterally toward the handle, the protrusion comprising a first recess having a protrusion locking surface configured to engage a first engagement surface of the locking mechanism when the knife is in the use position.

In some embodiments, the protrusion comprises a second recess having a detent surface configured to engage a second engagement surface of the locking mechanism when the knife is in the storage position.

In some embodiments, the protrusion is positioned around the third pivot axis such that the when the blade is in the storage position the recess is disposed at a first rotational position and when the blade is in the use position the recess is disposed at a second rotational position.

In some embodiments, the locking mechanism can comprise a biasing member configured to bias the locking mechanism into at least one of the locked position and the detent position.

In another representative embodiment, a folding knife comprises a blade having first and second engagement surfaces and being translatable between a storage position and a use position, a linkage assembly, and a handle. The linkage assembly can comprise a first linking element having a first end portion and a second end portion, the first end portion being pivotably coupled to the tang portion at a first pivot axis, and a second linking element having a first end portion and a second end portion, the first end portion being pivotably coupled to the tang portion at a second pivot axis. The handle can be pivotably coupled to the second end portion of the first linking element at a third pivot axis and pivotably coupled to the second end portion of the second linking element at a fourth pivot axis. The handle can comprise having first and second locking surfaces configured to engage the first and second engagement surfaces of the blade to resist movement of the blade when a force is applied to the blade at a location distal to the second pivot axis.

In some embodiments, the first and second linking elements have interlocking shapes such that when the blade is in the use position the first end portion of the first linking element sits within a recess in a center portion of the second linking element to resist movement when a force is applied in a first direction at a location proximal to the second pivot axis.

In some embodiments, the knife can further comprise a locking mechanism configured to engage the first linking element to resist movement of the linkage assembly when a force is applied in a second direction at a location proximal to the second pivot axis.

In some embodiments, the knife can further comprise one or more pivot elements extending through the linkage assembly and coupled to at least one of the handle and the blade. In some embodiments, each pivot element comprises a head portion and a shaft portion, the shaft portion including a threaded portion and a non-threaded portion, and wherein the linkage assembly rotates about the non-threaded portion.

In another representative embodiment, a folding knife comprises a handle having a grasping portion, a protrusion extending laterally from the handle, a blade having a tang portion and being translatable relative to the handle between a storage position and a use position, and a linkage assembly coupling the handle to the blade. The protrusion can comprise a first locking surface and a second locking surface. The tang portion of the blade can comprise a first edge portion and a second edge portion. When the blade is in the use position, the first locking surface can engage the first edge portion to resist movement of the blade in a first direction and the second locking surface can engage the second edge portion to resist movement of the blade in a second direction.

In some embodiments, the knife further comprises a locking mechanism movable between a locked position and an unlocked position, and wherein when in the locked position the locking mechanism is configured to engage the linkage assembly to retain the blade in the use position. In some embodiments, the locking mechanism comprises a biasing member configured to bias the locking mechanism into the locked position.

DETAILED DESCRIPTION

Described herein are embodiments of a knife having a self-locking linkage assembly.

Figure 1:
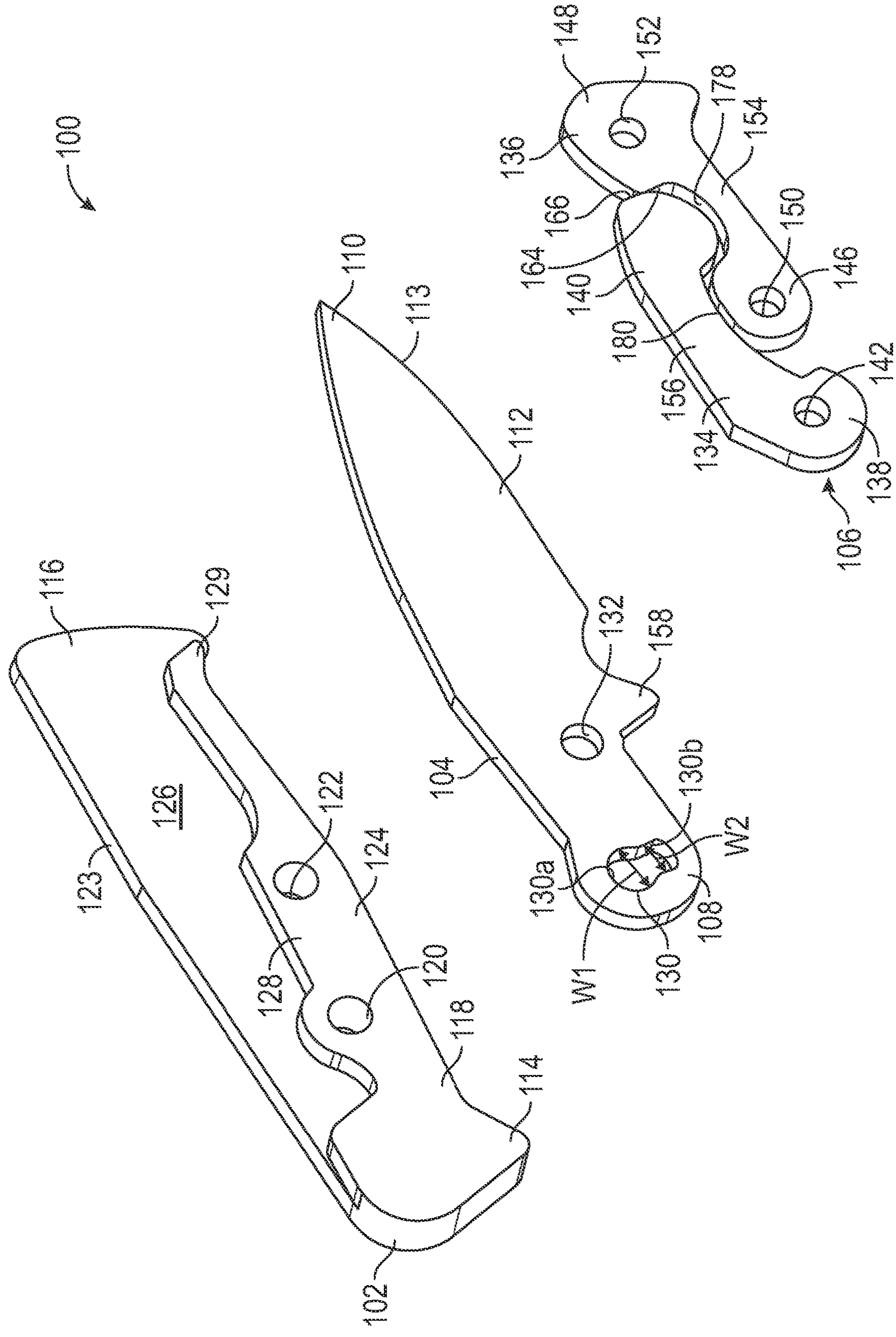
FIG. 1 is an exploded perspective view of an exemplary embodiment of a folding knife.

FIGS. 1-5 show an exemplary folding knife 100, according to one embodiment. As shown in FIG. 1, the knife 100 generally includes a handle 102, a blade 104, and a linkage assembly 106. The blade 104 can have a tang portion 108, a tip portion 110, and a cutting portion 112, which has a cutting edge 113. The blade 104 can be pivotably coupled to the handle 102 via the linkage assembly 106 such that the blade 104 can translate and pivot relative to the handle 102 between a use or open position (FIG. 5) in which the cutting portion 112 is exposed from the handle 102 and a storage or closed position (FIG. 2) in which the cutting portion 112 is protected (at least partially) by the handle 102.

The handle 102 can include a first or proximal end portion 114 and a second or distal end portion 116. The proximal end portion 114 can be configured as a grasping portion 118 to allow a user to grip the knife 100. The handle can have one or more openings (e.g., a first opening 120 and a second opening 122 in the illustrated embodiment) through which one or more pivot elements (144, 168, 174, and 176) can extend to pivotably couple the linkage assembly 106 to the handle 102.

The handle 102 can comprise a sidewall 123 and a projection 124. The projection 124 can extend laterally from a first surface 126 of the sidewall 123, as shown. In this manner, the area above the projection 124 forms an internal recess along the inner surface 126. The projection 124 can extend at least partially along the length of the sidewall 123 and can comprise a blade guard 128, and a blade stop 129. In some embodiments, the projection 124 can be formed integrally with the sidewall 123 (i.e., the components can be machined or otherwise formed from a single piece of material). Alternatively, the projection 124 and the sidewall 123 can be formed separately and joined later in the fabrication process, such as by fasteners (e.g., screws), or by welding. In alternative embodiments, the handle need not include a recessed inner surface and instead can comprise the portion forming the projection 124 without the portion of the sidewall 123 extending above the projection 124.

The blade 104 can include the tang portion 108, the tip portion 110, and the cutting portion 112, as mentioned above. The tang portion 108 can include one or more openings used to couple the blade 104 to the linkage assembly 106 (and thus to the handle 102). For example, in the illustrated embodiment, the tang portion 108 has a first opening configured as a locking opening 130 and a second opening 132. The locking opening 130 can have a first portion 130*a* having a first width W1 and a second portion 130*b* having a second width W2. The first width W1 can be greater than the second width W2. The first portion 130*a* can be, for example, substantially circular. The second portion 130*b* can be substantially rectangular.

Figure 2:
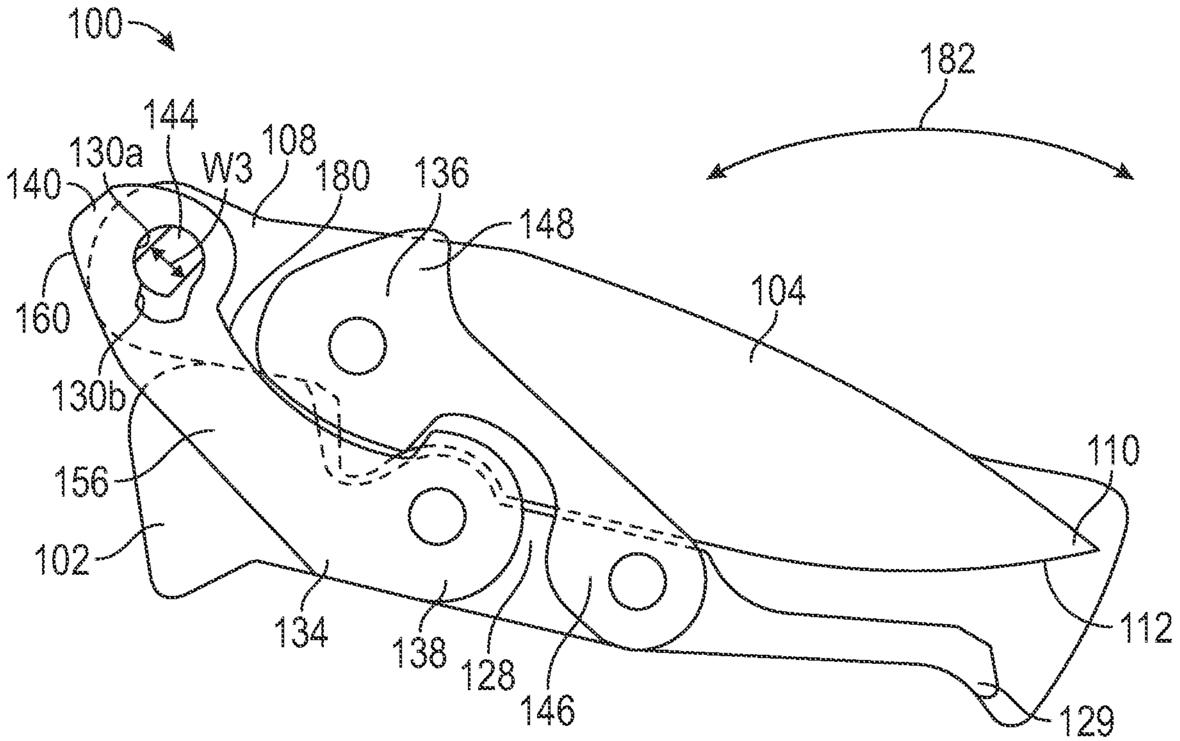
FIG. 2 is a side view of the folding knife of FIG. 1 showing the blade in the closed or storage position.

The blade 104 can be disposed laterally between the sidewall 123 of the handle 102 and the linkage assembly 106 within the recessed portion above the projection 124. As shown in FIG. 2, when the knife 100 is in the storage position, the cutting edge 113 of the blade 104 is at least partially shielded by the blade guard 128. In alternative embodiments, the knife 100 can have another handle portion on the opposite side of the blade from the handle 102; that is, the handle 102 comprises a first handle portion and a second, opposing handle portion is on the opposite side of the blade. The second handle portion can have the same overall size and shape as the first handle portion except that the second handle portion need not have a projection 124.

The linkage assembly 106 can include one or more linking elements. For example, in the illustrated embodiment, the linkage assembly 106 includes a first linking element or bar 134 and a second linking element or bar 136. In other embodiments, the linkage assembly 106 can include only a first linking element. Additional details of the linkage assembly can be found in U.S. Patent Application Publication No. 2018/0154531.

Figure 6:
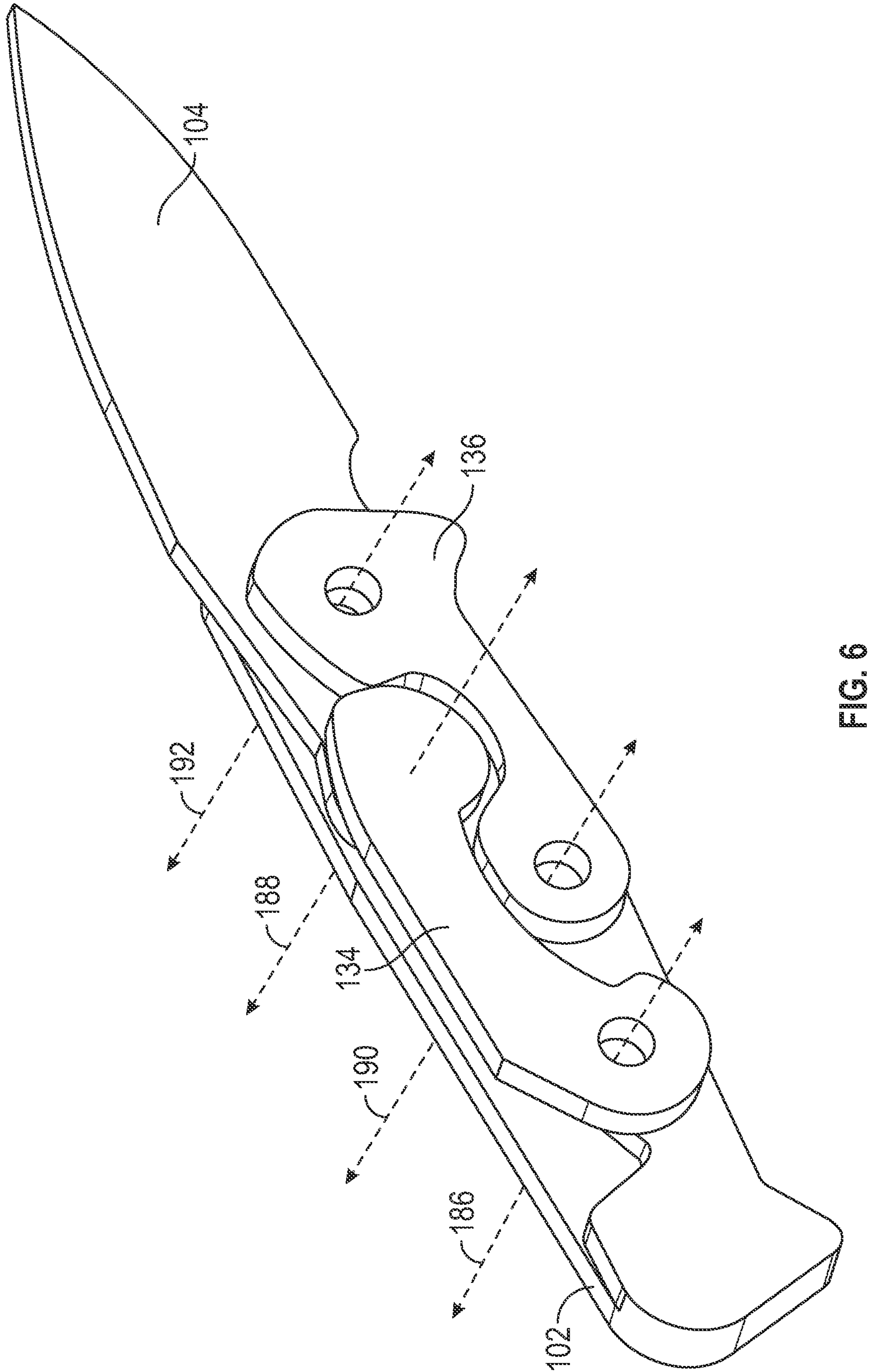
FIG. 6 is a perspective view of the folding knife of FIG. 1 showing the blade in the use position.

Referring again to FIG. 1, the first linking element 134 can have a proximal end portion 138, a distal end portion 140, an opening 142 extending through the proximal end portion 138, and a protrusion or pivot element 144 (see FIG. 2) extending from an inner surface of the distal end portion 140. The first linking element 134 can be pivotably coupled to the handle 102 at a first pivot axis 186 (FIG. 6) by a pivot element 168 (FIG. 3) extending through the opening 142 and the opening 120 in the handle. The first linking element 134 can be pivotably coupled to the blade 104 at a second pivot axis 188 by the pivot element 144 that extends through the first portion 130*a* of the locking opening 130 of the blade. The protrusion 144 can interact with the opening 130 of the blade 104 to permit locking of the blade in the use position by the first linking element, as described in more detail below.

In the illustrated embodiment, the protrusion 144 has a truncated circular shape (e.g., a shape comprising a circle with flat sides), having a length L (FIG. 3) and a width W3 (FIG. 2), wherein the length L is sized to allow the protrusion 144 to rotate within the first portion 130*a* of the locking opening 130 to function as a pivot element and wherein the width W3 of the protrusion is slightly smaller than the width W2 of the second portion 130*b* of the locking opening 130 such that the protrusion 144 can extend at least partially into the second portion 130*b* to allow a locking interconnection between the first linking element 134 and the second linking element 136, as further described below.

Figure 3:
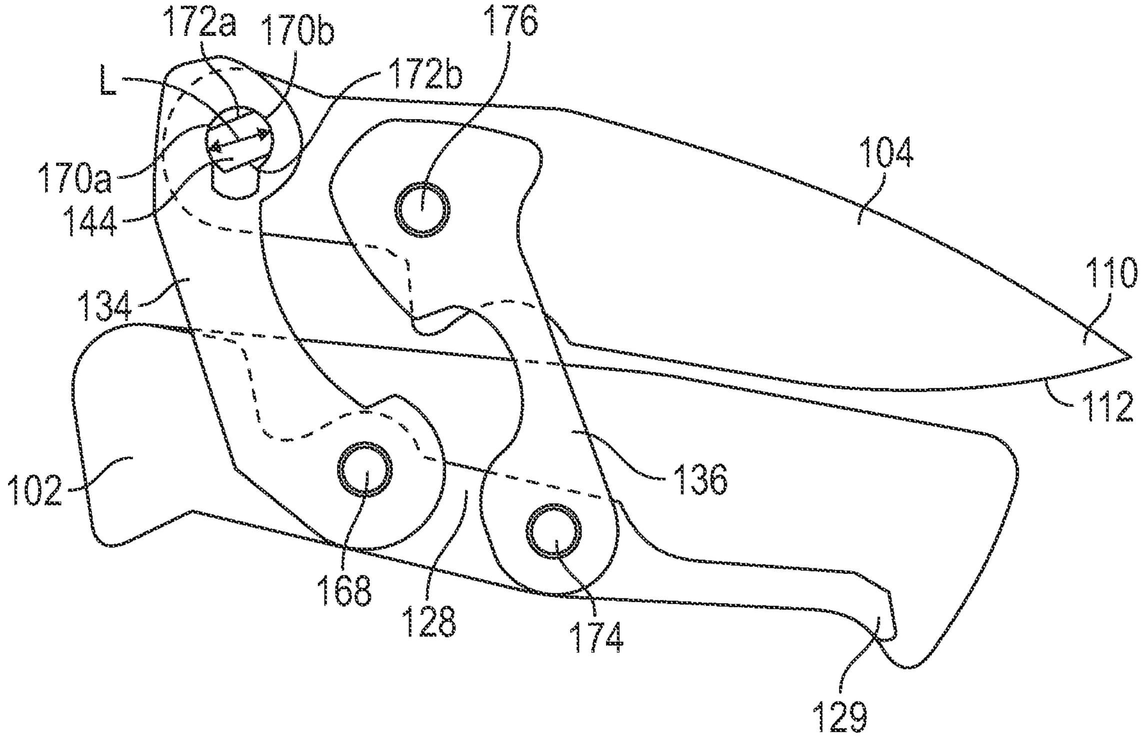
FIG. 3 is a side view of the folding knife of FIG. 1 showing the blade in a transitional position between the storage position and the open or use position.

In other embodiments, the protrusion 144 can have any of various non-circular shapes such as, without limitation, elliptical, square, triangular, cruciform (cross-shaped), rectangular, etc. While the overall shape of the protrusion 144 can take a variety of forms, at least a portion of outer circumferential surface of the protrusion 144 desirably is shaped to conform to the circular shape of the first portion 130*a* of the opening 130 to facilitate rotation of the protrusion 144 within the first portion 130*a*. For example, as best shown in FIG. 3, the protrusion 144 in the illustrated embodiment has curved first and second opposing surfaces 170*a*, 170*b*, respectively, extending between respective ends of flat side surfaces of the 172*a*, 172*b*, with the curved surfaces 170*a*, 170*b* being curved to match the curved inner surface of the first portion 130*a* of the opening 130.

The second portion 130*b* of the locking opening 130 can have any corresponding shape and size such that at least a portion of the protrusion 144 can extend into the second portion 130*b* of the locking opening 130 when the knife 100 is in the use position. For example, in the illustrated embodiment, the second portion 130*b* has two substantially flat and parallel surface that correspond to the flat surfaces 172*a*, 172*b* of the protrusion.

The second linking element 136 can have a proximal end portion 146 and a distal end portion 148. The proximal end portion 146 can have a first opening 150 and the distal end portion 148 can have a second opening 152. The second linking element 136 can be coupled to the handle 102 at a third pivot axis 190 (FIG. 6) by a pivot element 174 (FIG. 3) extending through the first opening 150 and the opening 122 in the handle. The second linking element 136 can be coupled to the blade 104 at a fourth pivot axis 192 (FIG. 6) by a pivot element 176 (FIG. 3) extending through the second opening 152 and the opening 132 in the blade.

As shown in FIGS. 2-5, the folding knife 100 can move between the closed or storage position (FIG. 2) and the open or use position (FIG. 5) by translation of the blade 104 along an arcuate path 182. Referring to FIG. 2, to open the folding knife 100, a user can grip the handle 102 while applying force (e.g., manual force using a thumb) to the first linking element 134 or the blade 104 causing the first and second linking elements 134, 136 to pivot relative to the handle 102 and the blade 104 while translating the blade 104 distally along the arcuate path 182. As shown in the illustrated embodiment, the first linking element 134 can have an angled surface 160 at the distal end portion 140 of the first linking element 134 and thus a proximal end of the knife 100 when the knife 100 is in the storage position. The angled surface 160 can, for example, assist a user in moving the knife 100 from the storage position to the use position.

The linking elements 134, 136 can have interlocking shapes such that the distal end portion 140 of the first linking element 134 can be received within a recess or cutout 178 formed in a central portion 154 of the second linking element 136 when the knife 100 is in the use position (see e.g., FIG. 5), and wherein the distal end portion 148 of the second linking element 136 can be received within a recess or cutout 180 formed in a central portion 156 of the first linking element 134 when the knife 100 is in the storage position (see e.g., FIG. 2). The recess 178 can be shaped to correspond generally to the shape of the distal end portion 140 of the first linking element. Similarly, the recess 180 can be shaped to correspond generally to the shape of the distal end portion 148 of the second linking element.

Referring to FIG. 2, when in the storage position, the protrusion 144 of the first linking element 134 can be disposed in or extend into the first portion 130*a* of the locking opening 130 in the tang 108 of the blade 104. The protrusion 144 can be sized such that it can rotate within the first portion 130*a*. For example, a length L of the protrusion 144 can be slightly smaller than the width W1 of the first portion 130*a* such that surfaces 170*a*, 170*b* can slide against the inner surface of the first portion 130*a* of the opening. Thus, the protrusion 144 can act as a pivot element while the blade 104 moves between the storage and use positions, as shown in FIGS. 3 and 4.

Figure 4:
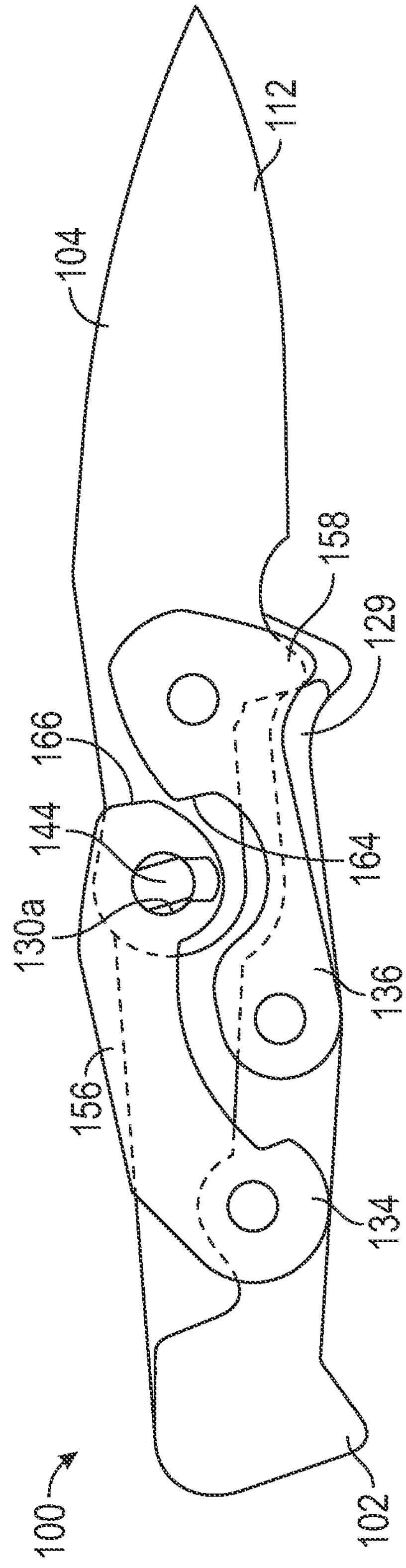
FIG. 4 is a side view of the folding knife of FIG. 1 showing the blade in another transitional position just prior to reaching use position.

As the blade 104 moves relative to the handle 102, the protrusion 144 and the blade 104 pivot relative to one another about the second pivot axis 188 (see e.g., FIGS. 3 and 4). As shown in FIGS. 2-5, the protrusion 144 and the locking opening 130 can be sized and/or shaped such that the protrusion 144 cannot be inserted into the second portion 130*b* of the locking opening 130 when the protrusion 144 and the second portion 130*b* are rotationally offset (e.g., FIGS. 2-4) and such that the protrusion 144 can be inserted into the second portion 130*b* of the locking opening 130 when the protrusion 144 and the second portion 130*b* are rotationally aligned (e.g., FIG. 5) due to the alignment of the width W3 of the protrusion 144 with the width W2 of the second opening 130*b*.

As used herein, the term "rotationally aligned" means that the width W3 of the protrusion is in a rotational position relative to the second portion 130*b* of the locking opening 130 such that the protrusion can fit or slide into the second portion 130*b*. The term "rotationally offset" means that the protrusion 144 is in a rotational position relative to the second portion 130*b* such that the protrusion 144 cannot fit or slide into the second portion 130*b* of the locking opening 130.

Figure 5:
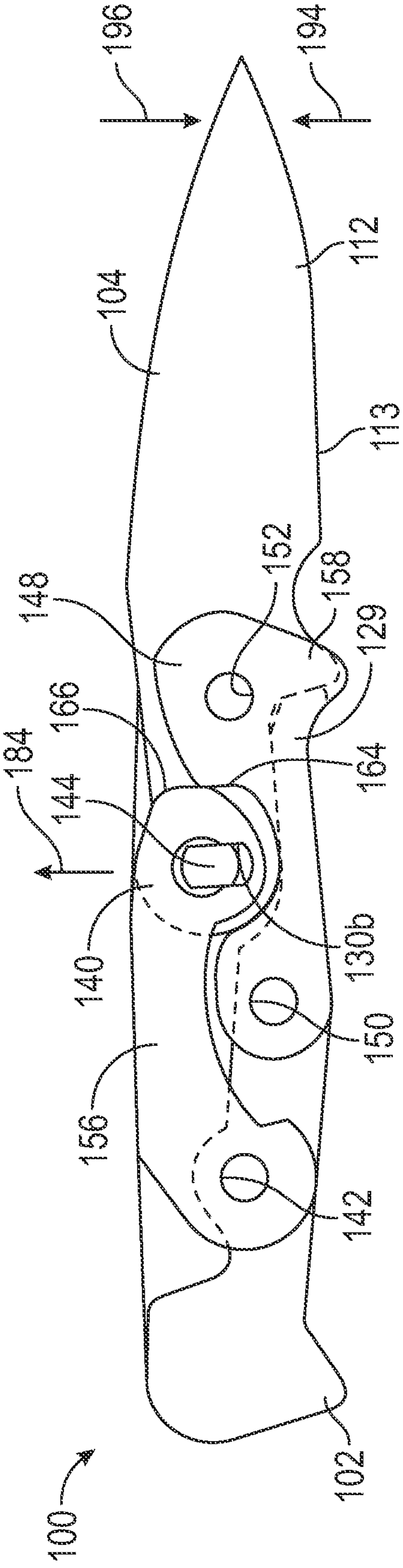
FIG. 5 is a side view of the folding knife of FIG. 1 showing the blade in the use position.

As shown in FIG. 5, when the blade reaches the use position, the protrusion 144 becomes rotationally aligned with the second portion 130*b* of the locking opening 130 such that at least a portion of the protrusion 144 can slide or extend into the second portion 130*b*. The width W2 of the second portion 130*b* can be slightly larger than the width W3 of the protrusion such that the protrusion 144 can slide into and out of the second portion 130*b*.

Movement of the protrusion 144 into the second portion 130*b* permits a limited amount of pivoting movement of the first linking element 134 relative to the second linking element 136 and the blade 104. This allows the distal end portion 140 of the first linking element 134 to be received within a recess or cutout 178 of the second linking element 136 and causes a proximal surface 164 (which functions as a first lock-face) of the distal end portion 148 of the second linking element 136 to engage a distal surface 166 (which functions as a second lock-face) of the distal end portion 140 of the first linking element 134. This can be referred to as the locked orientation of the first and second linking elements. The engagement between surfaces 164, 166 resists closing forces exerted on the blade 104 or the second linkage 136. A closing force on the blade can be an upwardly force against the cutting edge, as represented by arrow 194. This force is resisted by the engagement of surfaces 164, 166 and is transmitted back to the pivot element 168. In this manner, the first linking element 134 in cooperation with the second linking element 136 serve as a locking mechanism for resisting against inadvertent closure of the blade 104. The linkage assembly 106 therefore can be referred to as a "self-locking" linkage assembly.

In alternative embodiments, the opening 130 in the blade need not have two portions with different dimensions but is otherwise configured to permit pivoting of the first linking element 134 relative to the second linking element and the blade to the locked orientation. For example, the opening 130 can be circular or substantially circular and can be slightly oversized relative to the width or diameter of the protrusion 144 such that the first linking element can further pivot once the blade reaches the use position.

In some embodiments, the tang portion 108 of the blade 104 can include an extension portion 158 that abuts and/or engages the blade stop 129 of the handle 102 when the knife 100 is in the use position. The engagement of the extension portion 158 and the blade stop 129 resists movement of the cutting portion 112 of the blade 104 toward the fingers of a user if a downward force (indicated by arrow 196) is applied to a portion of the blade opposite the cutting edge 113.

To unlock the knife 100 from the use position, a user can apply a force (e.g., an upward force in the direction of arrow 184 shown in FIG. 5) to the first linking element 134 to remove the protrusion 144 from the second portion 130*b* of the locking opening 130 and to remove the distal end portion 140 from engagement with the surface 164, thus allowing the protrusion 144 to rotate within the first portion 130*a* (see e.g., FIG. 4). The blade 104 can then be pivoted and translated rearward relative to the linkage assembly 106 and the handle 102 along the arcuate path 182 until it reaches the storage position.

In some embodiments, the knife 100 can further comprise a biasing member (not shown) configured to exert a biasing force against the first linking element 134, biasing the first linking element 134 into the locked orientation wherein the protrusion 144 is received within the second portion 130*b* of the opening 130 and the distal end portion 140 of the first linking element engages the surface 164 of the second linking element 136. The biasing member can be, for example, a spring, such as a coil spring or a torsion spring. The biasing force of the biasing member helps maintain the first linking element in the locked orientation during normal use of the knife. To unlock the blade, the user applies an upward force to the first linking element 134 (in the direction of arrow 184) sufficient to overcome the force of the biasing member and move the protrusion into the first portion 130*a* of the opening 130. From there, the blade 104 can be moved to its rearward, closed position as previously described.

In some embodiments, force applied by the biasing member can assist in moving the knife 100 from the storage position to the use position, therefore allowing less force to be applied by the user.

In some embodiments, the first linking element 134 can further comprise an actuator (not shown) configured to be engaged by a user. The actuator can extend from, for example, the central portion 156 or the distal portion 140 of the first linking element 134 and can be a thumb stud, handle, lever, or other member configured to facilitate movement (e.g., upwards movement in the orientation shown in FIG. 5) of the first linking element 134 when the knife 100 is in the use position. For example, in particular embodiments, the knife can have first and second handle portions on opposite sides of the blade and the linking elements 134, 136. In such embodiments, the first linking element 134 can be disposed completely within the space between the first and second handle portions except for the actuator, which can extend laterally through a slot or opening in one of the handle portions or upwardly beyond the top margin of the handle for engagement with a digit of the user.

Figure 7:
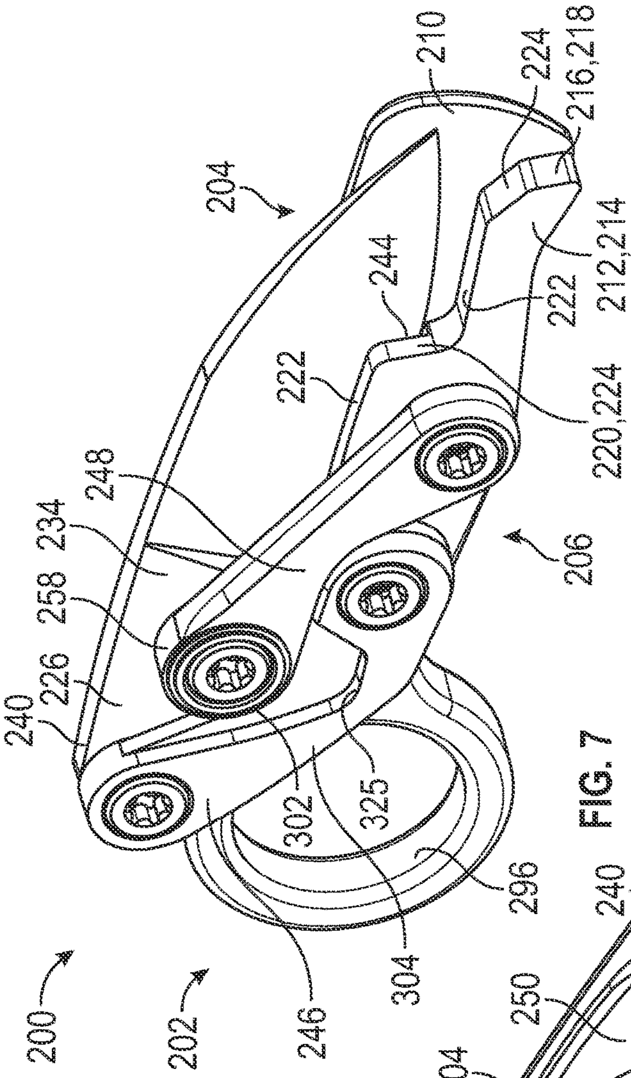
FIG. 7 is a perspective view of an exemplary embodiment of a folding knife in the closed or storage position.
Figure 8:
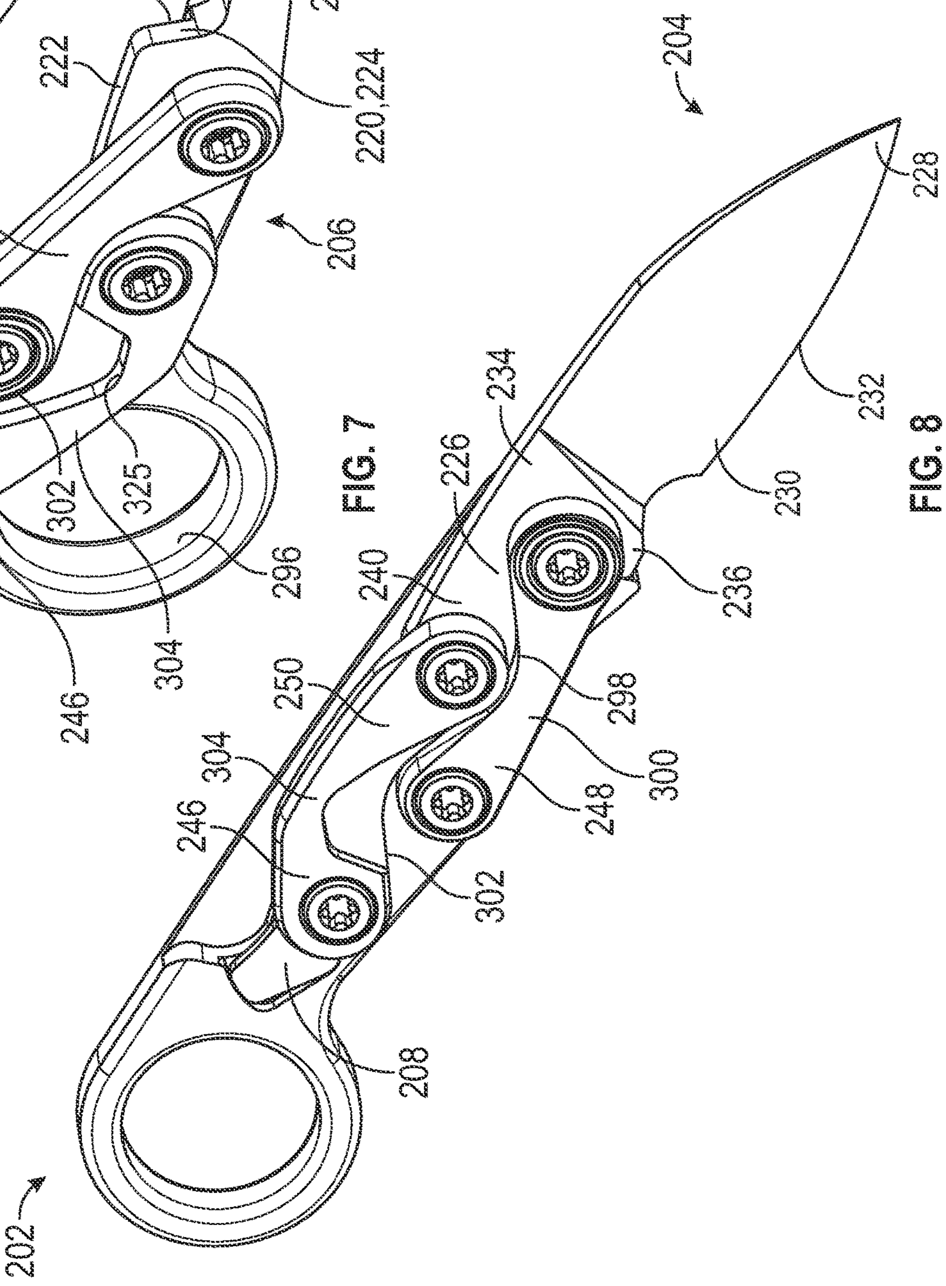
FIG. 8 is a perspective view of the folding knife of FIG. 7 in the open or use position.

FIGS. 7-18 show an exemplary folding knife 200, according to another embodiment. The knife 200 can be similar to the knife 100 except for certain differences described below. As shown in FIG. 7, the knife 200 generally includes a handle 202, a blade 204, and a linkage assembly 206. In some embodiments, the knife 200 can further include a locking mechanism 208 (FIG. 8).

Figure 9:
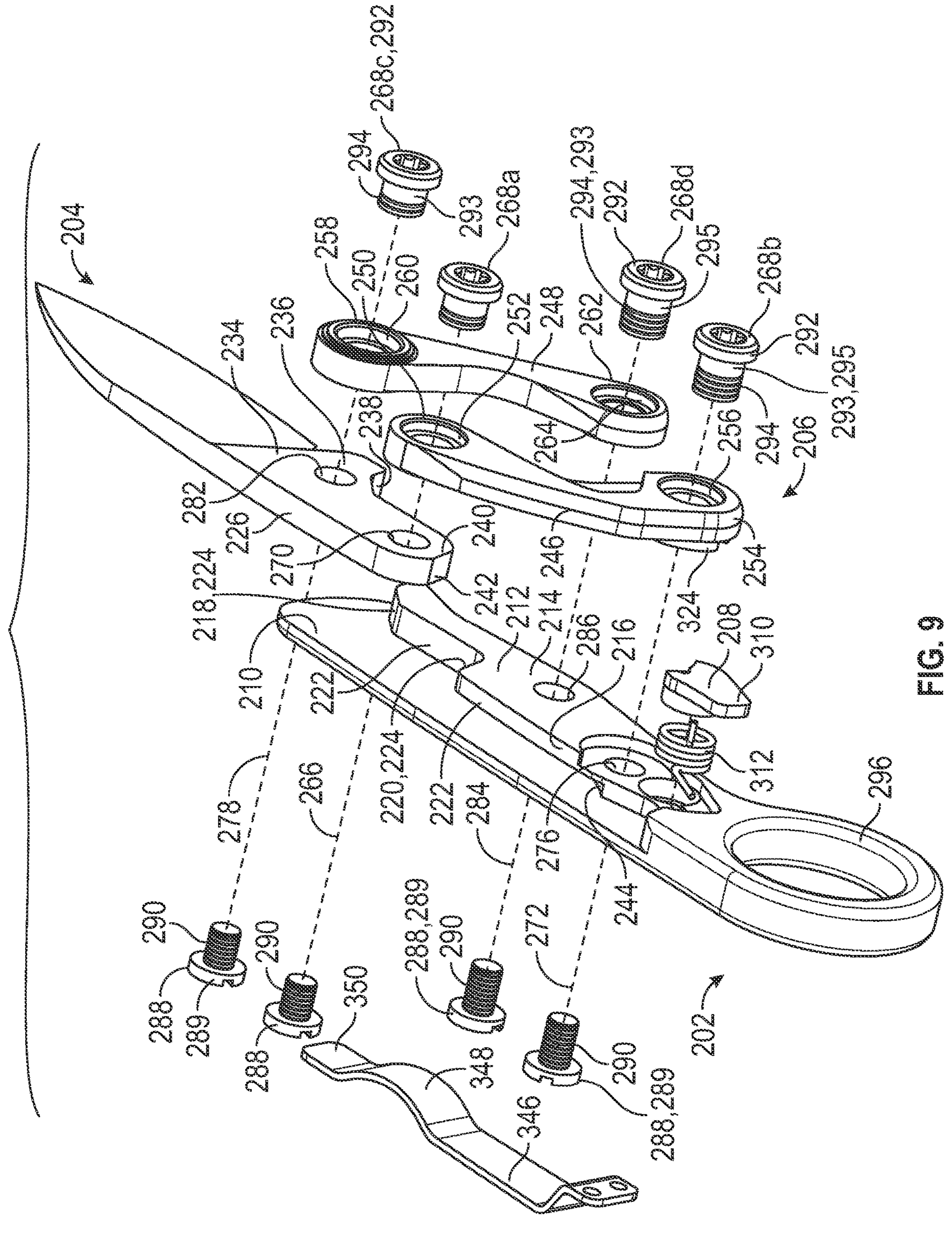
FIG. 9 is an exploded perspective view of the folding knife of FIG. 7.

As best shown in FIG. 9, the handle 202 can comprise a sidewall 210 and a protrusion 212. The protrusion 212 can extend laterally from the sidewall 210, as shown. The protrusion 212 can extend at least partially along the length an inner surface of the sidewall 210 and can comprise an outer surface 214 and an edge portion 216. The edge portion can comprise first and second locking surfaces 218, 220. The locking surfaces 218, 220 can be configured to engage portions of the blade 204 to resist movement of the blade 204 in one or more directions when forces are applied to the blade, as described in more detail below.

Figure 10:
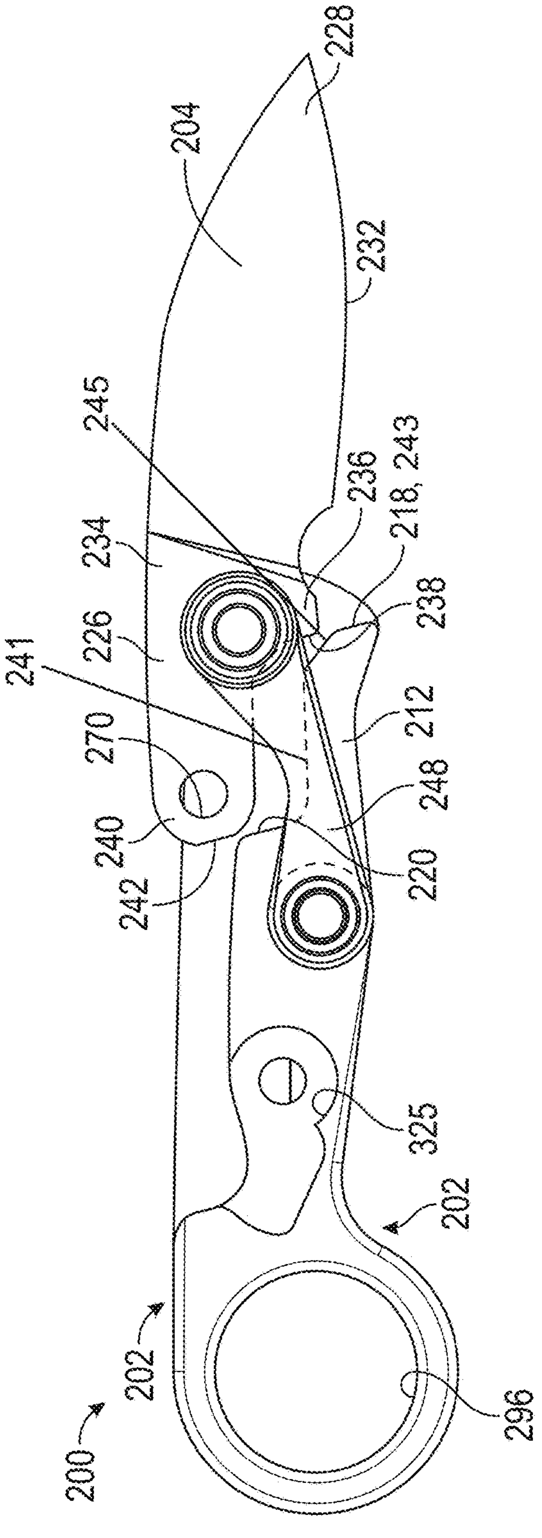
FIG. 10 is a side view of the folding knife of FIG. 7 in a transitional position between the storage position and the use position with the first linking element removed.

As shown in the illustrated embodiment, the edge portion 216 of the protrusion 212 can have a "stepped" shape comprising alternating longitudinally extending surfaces 222 and angled surfaces 224 (as best shown in FIG. 9). In the illustrated embodiment, the angled surfaces 224 can comprise the first and second locking surfaces 218, 220. In other embodiments, the protrusion can have any of various shapes. In the embodiment of FIG. 10, the protrusion 212 can comprise a first surface portion 241, a second surface portion 243, and a third surface portion 245. The second surface portion 243 can extend downwardly at a first angle relative to the first surface portion 241, and the third surface portion 245 extends downwardly at a second angle relative to the first surface portion 241, the first angle being different than the second angle. In FIG. 10, the first and second surface portions are not colinear with one another.

In some embodiments, the protrusion 212 can be formed integrally with the sidewall 210 (i.e., the components can be machined or otherwise formed from a single piece of material). Alternatively, the protrusion 212 and the sidewall 210 can be formed separately and joined later in the fabrication process, such as by fasteners (e.g., screws), or by welding.

Referring now to FIG. 8, the blade 204 can have a tang portion 226, a tip portion 228, and a cutting portion 230, which has a cutting edge 232. As shown in FIG. 9, the tang portion 226 can have a distal end portion 234 comprising a projection 236 having first tang edge portion 238. The tang portion 226 can also have a proximal end portion 240 comprising a second tang edge portion 242. The first and second tang edge portions 238, 242 can be oriented to face proximally. When the knife 200 is in the use position, the first and second tang edge portions 238, 242 can engage the first and second locking surfaces 218, 220 to prevent or mitigate movement of the blade 204.

The blade 204 can be disposed laterally between the sidewall 210 of the handle 202 and the linkage assembly 206. The blade 204 can be pivotably coupled to the handle 202 via the linkage assembly 206 such that the blade 204 can translate and pivot relative to the handle 202 between an open or use position (FIG. 8) in which the cutting portion 232 is exposed from the handle 202 and a closed or storage position (FIG. 7) in which the cutting portion 232 is protected (at least partially) by the handle 202.

As shown in FIG. 7, the protrusion 212 can further comprise a slot 244 configured as a blade guard. When the blade 204 is in the storage position the cutting edge 232 of the blade 204 can be at least partially disposed within the blade guard 244.

The linkage assembly 206 can comprise one or more linking elements. For example, in the illustrated embodiment, the linkage assembly comprises a first linking element 246 and a second linking element 248. Referring again to FIG. 9, the first linking element 246 can have a distal end portion 250 comprising a first opening 252 and a proximal end portion 254 comprising a second opening 256. The second linking element 248 can have a distal end portion 258 comprising a first opening 260 and a proximal end portion 262 comprising a second opening 264.

The first linking element 246 can be coupled to the tang portion 226 of the blade 204 at a first pivot axis 266 by a pivot element 268*a* extending through the first opening 252 and through a first opening 270 in the tang portion 226. The first linking element 246 also can be coupled to the handle 202 at a second pivot axis 272 by a pivot element 268*b* extending through the second opening 256 and a first opening 276 in the handle 202.

The second linking element 248 can be coupled to the tang portion 226 of the blade 204 at a third pivot axis 278 by a pivot element 268*c* extending through the first opening 260 and through a second opening 282 in the tang portion 226. The second linking element 248 also can be coupled to the handle 202 at a fourth pivot axis 284 by a pivot element 268*d* extending through the second opening 264 and a second opening 286 in the handle 202.

In the illustrated embodiment, each pivot element 268 includes a head 292, a shaft 293 comprising a threaded portion 294 and a non-threaded portion 295, and an internal socket (not shown) having a threaded surface. The shaft 293 of each pivot element can extend through a corresponding opening in the linkage assembly 206 and into an opening in the tang portion 226 and/or the handle 202. For example, the shaft 293 of the pivot element connecting the second linking element 248 and the blade 204 can extend through opening 260 in the second linking element 248 and into opening 282 in the tang portion 226 of the blade 204. The openings in the tang portion 226 (e.g., openings 270, 282) and the handle

202 (e.g., openings 276, 286) can comprise correspondingly threaded surfaces configured to receive the threaded portions 294 of the pivot elements 268.

The shafts 293 of the pivot elements 268 can be sized such that the non-threaded portions 295 reside within the openings in the linking elements 246, 248 (e.g., openings 260, 264, 252, 256) while the threaded portions 294 can be tightened into the openings in the handle 202 (e.g., openings 276, 286) and the tang portion 226 (e.g., openings 270, 282). The threaded portions of the pivot elements 268 retain them in place in the assembled state. This configuration also allows the pivot elements **268*a*, 268*c* to remain stationary relative to the tang portion 226 and the pivot elements 268*b*, 268*d* to remain stationary relative to the handle 202 while allowing the linking elements 246, 248 to pivot around the pivot elements 268 when the blade 204 is moved between the storage and use positions. In other embodiments, the shafts 293 of the pivot elements 268** need not comprise respective threaded portions.

Each pivot element 268 optionally can receive a corresponding fastener 288 having a head portion 289 and a shaft 290 having a threaded outer surface. At least a portion of each shaft 290 can extend through a corresponding opening in the handle 202 and into the internal socket of a corresponding pivot element 269 with the threaded outer surface of the shaft 290 tightened into thread portion of the internal socket to assist in retaining the pivot element in place.

Similarly to the linking elements 134, 136 of knife 100 described above, the first and second linking elements 246, 248 can have interlocking shapes such that the distal end portion 250 of the first linking element 246 can be received within a cutout or recess 298 formed in a central portion 300 of the second linking element 248 when the knife 200 is in the use position (see, e.g., FIG. 8), and wherein the distal end portion 258 of the second linking element 248 can be received within a cutout or recess 302 formed in a central portion 304 of the first linking element 246 when the knife 200 is in the storage position (see, e.g., FIG. 7).

Referring again to FIGS. 7-8, the folding knife 200 can move between the closed or storage position (FIG. 7) and the open or use position (FIG. 8) by translation of the blade 204 along an arcuate path. Referring to FIG. 7, to open the folding knife 200, a user can grip handle 202 (e.g., using gripping portion 296) while applying force (e.g., manual force using a thumb) to the first linking element 246 or the blade 204 causing the first and second linking elements 246, 248 to pivot relative to the handle 202 and the blade 204 while translating the blade 204 distally along the arcuate path.

Figure 11:
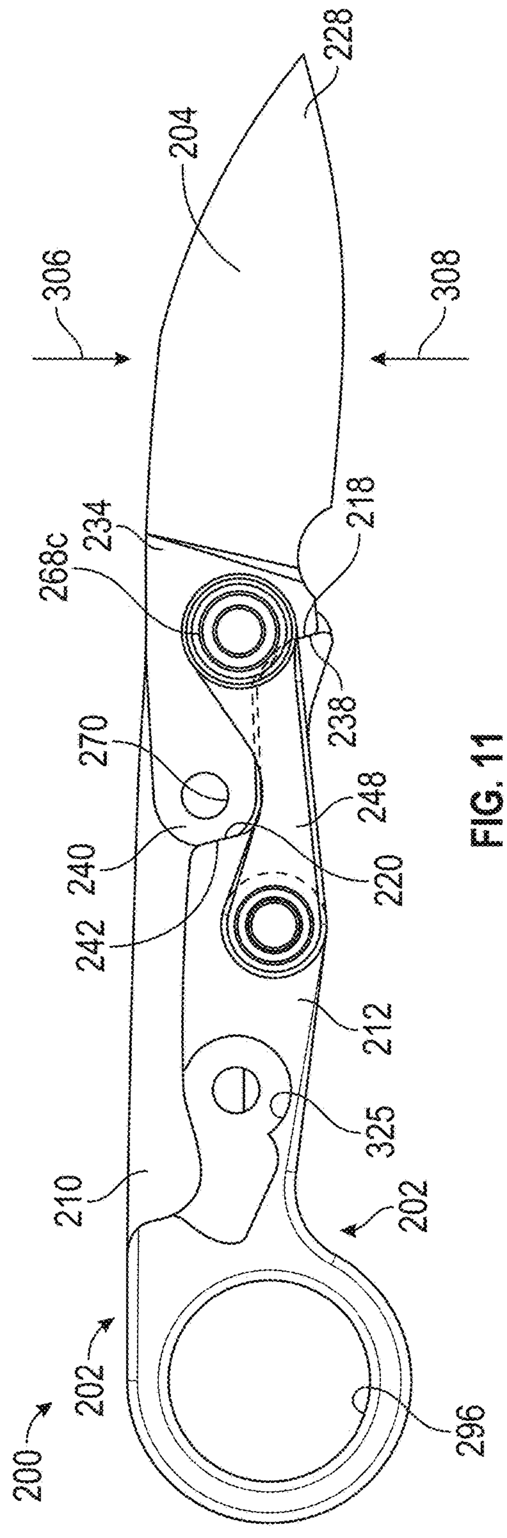
FIG. 11 is a side view of the folding knife of FIG. 7 in the use position with the first linking element removed.

FIGS. 10-11 show the knife 200 without the first linking element 246 for purposes of illustration. FIG. 10 shows the knife 200 in a transitional or intermediate position between the storage position and the use position, and FIG. 11 shows the knife 200 in the use position. As shown in FIG. 11, when in the use position the first locking surface 218 engages the first tang edge portion 238 to prevent or mitigate movement of the blade 204 when a downward force (indicated by arrow 306) is applied to the blade 204. The second locking surface 220 engages the second tang edge portion 242 to prevent or mitigate movement of the blade 204 when an upward force (indicated by arrow 308) is applied to the blade. In other words, when the blade is in the use position, the engagement of the locking surfaces 218, 220 with the tang edge portions 238, 242 can prevent or mitigate movement of the blade 204 under "primary loads," (e.g., loads applied to the blade 204 at one or more locations distal to the third pivot axis 278 and the pivot element **268*c*, that is, loads applied to the blade at one or more locations to the right of the third pivot axis 278 and the pivot element 268*c* in FIG. 11**).

Referring now to FIGS. 12-15, as mentioned previously, the knife 200 can further comprise a locking mechanism 208 configured to resist inadvertent movement of the linkage assembly when the blade is in the use position. The locking mechanism 208 can be pivotable about a pivot axis 340 extending through the locking mechanism, and can be movable between two or more rotational positions about the pivot axis 340. For example, in the illustrated embodiment the locking mechanism can be pivotable between a first rotational position configured as a locked position, a second rotational position configured as a detent position, and a third rotational position configured as an unlocked position. In other embodiments, the locked position and the detent position can be the same position, as described in more detail below.

When the locking mechanism 208 is in the locked position and the blade and the linkage assembly are in the use position (FIG. 15), the locking mechanism 208 is configured to retain the linkage assembly 206 in the use position, thereby resisting inadvertent closing of the blade. When the locking mechanism 208 is moved to the unlocked position while the blade and the linkage assembly are in the use position, the blade 204 and the linkage assembly can be moved from the use position to the storage position. When the locking mechanism 208 is in the detent position and the blade and the linkage assembly are in the storage position (FIG. 14), the locking mechanism 208 is configured to selectively retain the linkage assembly in the storage position until sufficient force is placed upon the linkage assembly by a user to open the blade, as described in more detail below.

The locking mechanism 208 can comprise a locking member 310 and a biasing member 312 configured to bias the locking member 310 away from the unlocked position. In the illustrated embodiment, the biasing member 312 comprises a torsion spring, although various other types of springs (e.g., a leaf spring) or biasing members can be used. The biasing member 312 can have a first end portion 311 extending generally parallel to the pivot axis 340 and a second end portion 313 extending radially away from the pivot axis 340. The biasing member 312 can be configured to bias the locking member 310 into the locked position and/or the detent position, depending on the position of the linkage assembly 206.

Figure 12:
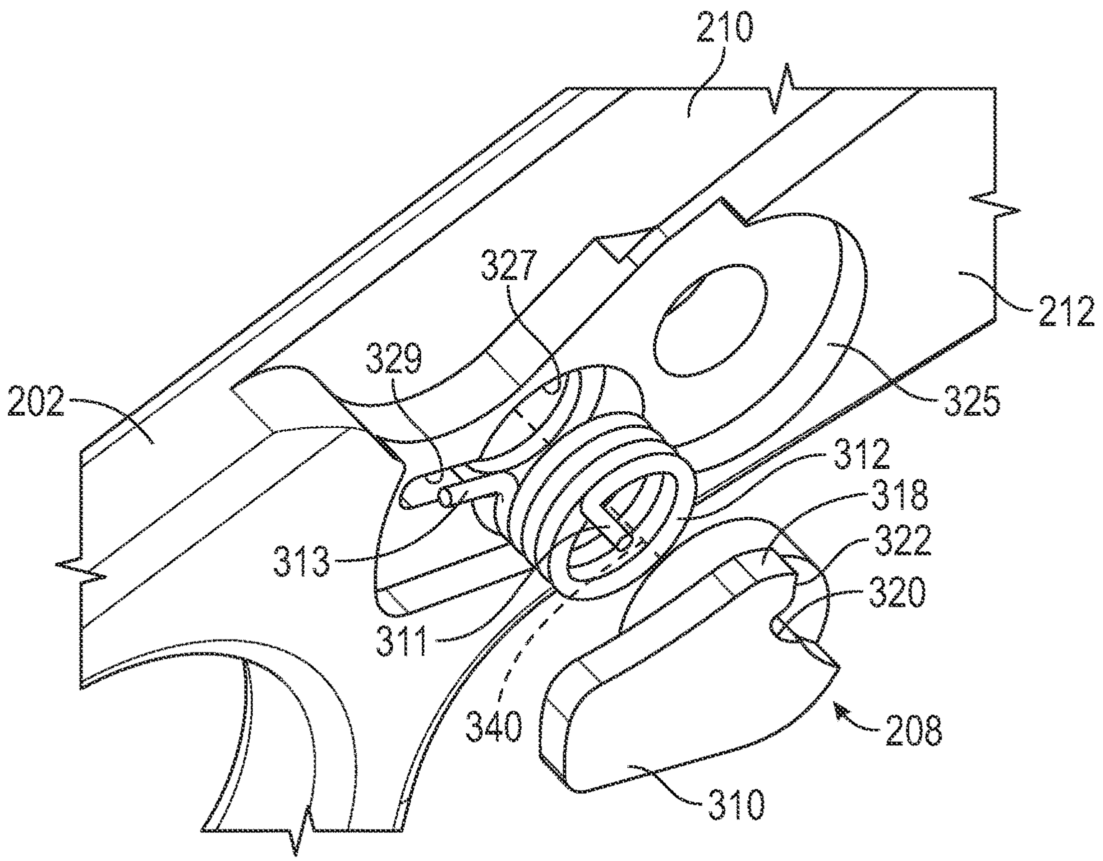
FIG. 12 is an exploded perspective view of the locking mechanism of the folding knife of FIG. 7.

As shown in FIG. 12, the protrusion 212 of the handle 202 can comprise a first recess 325 extending laterally into the protrusion 212 and a second recess 327 extending laterally into the first recess 325. The second recess 327 can comprise a channel 329 sized to retain the second end portion 313 of the biasing member 312 to prevent the biasing member from rotating within the second recess 325 when a force is applied to the locking member 310.

Figure 13:
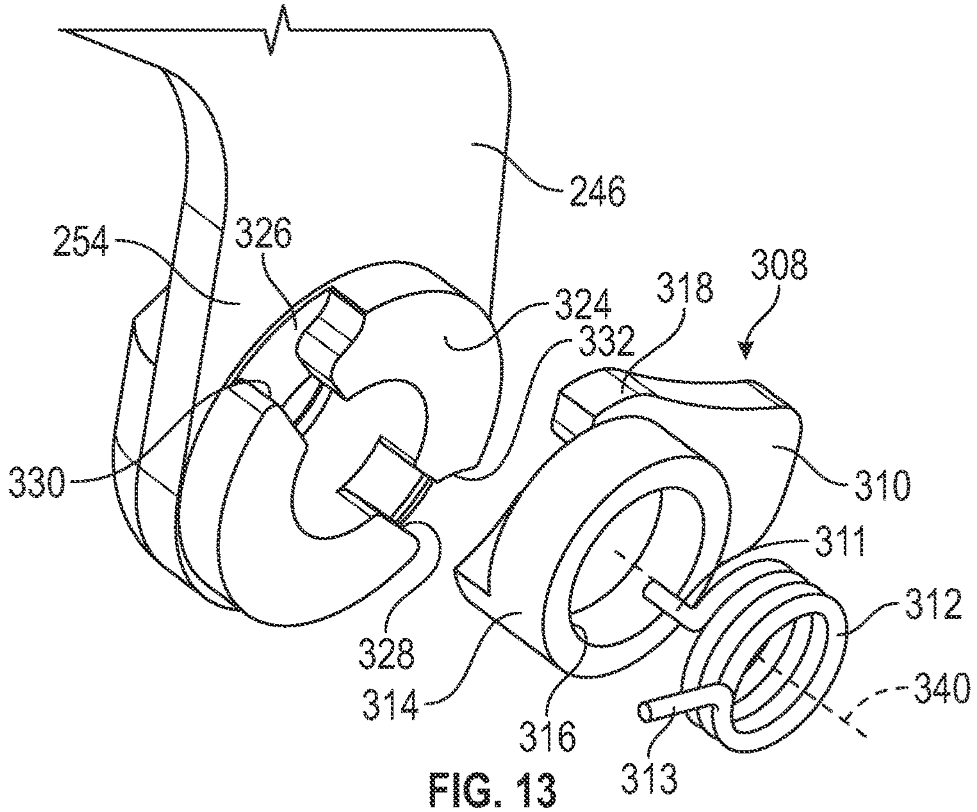
FIG. 13 is another exploded perspective view of the locking mechanism of the folding knife of FIG. 7.

The locking member 310 can comprise a cylindrical portion 314 defining a bore 316 (FIG. 13). The biasing member 312 can be disposed at least partially within the bore 316 of the cylindrical portion 314. The first end portion 311 of the biasing member 312 can be fixed relative to the locking member 310 such that rotation of the locking member 310 results in movement of the first end portion 311 and loading of the spring. For example, in some embodiments, first end portion 311 can extend into an opening or slot in the cylindrical portion 314 of the locking member 310.

This configuration allows the biasing member 312 to bias the locking member 310 out of the unlocked position into the locked and/or detent positions. For example, when a force is applied to the locking member 310 to move the locking member 310 relative to the handle from the locked position to the unlocked position (e.g., by pressing down on the locking member 310 in the direction of arrow 337 in FIG. 15), the locking member 310 and the first end portion 311 rotate about the pivot axis 340. Since the second end portion 313 of the biasing member 312 is held stationary relative to the handle, the biasing member 312 becomes compressed or loaded under the applied force. Once the force is released from the locking member 310, the biasing member 312 expands, thus biasing the locking member 310 into the locked and/or detent positions.

As best shown in FIG. 12, the locking member 310 can comprise a first engagement surface 318 and a cutout 320 defining a second engagement surface 322. The first and second engagement surfaces 318, 322 can be configured to engage portions of the first linking element 246, as described in more detail below.

Referring to FIG. 13, the proximal end portion 254 of the first linking element 246 can comprise a projection 324 extending toward the handle 202. The projection 324 and the locking mechanism 208 can be disposed within the first recess 325 (FIG. 12). In the illustrated embodiment, the projection 324 is a cylindrical boss having first and second cutouts 326, 328 which comprise a cam surface 330 and a locking surface 332, respectively. In the illustrated embodiment, the first and second cutouts 326, 328 are radially opposite one another across the diameter of the projection 324. However, in other embodiments, the first and second cutouts 326, 328 can be located at any position around the circumference of the projection 324. In still other embodiments, the projection can have any of various shapes configured to include a locking surface and/or a detent surface.

Figure 14:
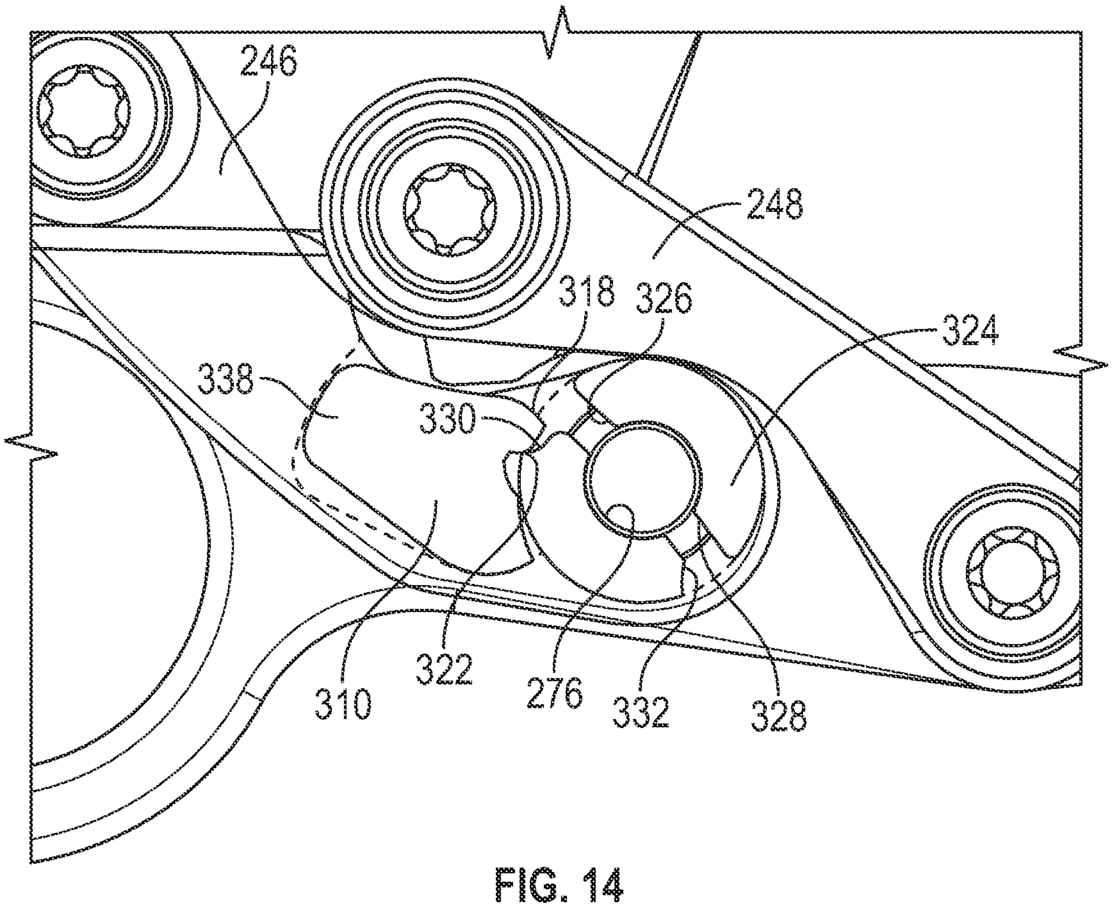
FIG. 14 is a side view of a portion of the folding knife of FIG. 7 in the storage position.

As shown in FIG. 14, the projection 324 can be disposed around the opening 276 such that when the knife 200 is in the storage position (FIG. 14) the first cutout 326 is adjacent the locking member 310, and such that when the first linking element 246 pivots from the storage position to the use position (FIG. 15) the projection 324 rotates around pivot axis 272 (FIG. 9) until the second cutout 328 is adjacent the locking member 310.

When the knife 200 is in the storage position (FIG. 14), the biasing member 312 can bias the locking member 310 into the detent position such that the second engagement surface 322 of the locking member 310 engages the cam surface 330 of the projection 324 to selectively retain the knife 200 in the storage position until acted upon by a user. The cam surface 330 and the second engagement surface 322 can be configured such that a predetermined amount of force applied to the blade 204 and/or the linkage assembly can overcome the biasing force and allow the blade and the linkage assembly to move from the storage position to the use position. In other words, when the blade is in the storage position and a predetermined force greater than the biasing force is applied to the blade 204 and/or the linkage assembly, the projection 324 can begin to rotate relative to the second engagement surface 322, which pushes the second engagement surface 322 out of the cutout 326 against the biasing force of the biasing member 312. The continued application of force to the blade 204 and/or the linkage assembly moves the blade to the use position. As the blade moves to the use position, the second engagement surface 330 can slide along the outer surface of the projection 324.

The engagement of the cam surface 330 and the second engagement surface 322 helps retain the blade 204 in the storage position against the weight of the blade, yet allows movement of the blade away from the storage position against the biasing force without actuating the locking member 310. Typically, in use, the blade 204 can be moved from storage position to the use position by applying a pushing force against the rear of the tang portion of the blade and/or the end portion of the first linkage element 246 that is connected to the tang portion. However, it should be understood that the user can apply a force at various locations on the blade, the first linkage element, and/or the second linkage element to move the blade from the storage position to the use position.

Figure 15:
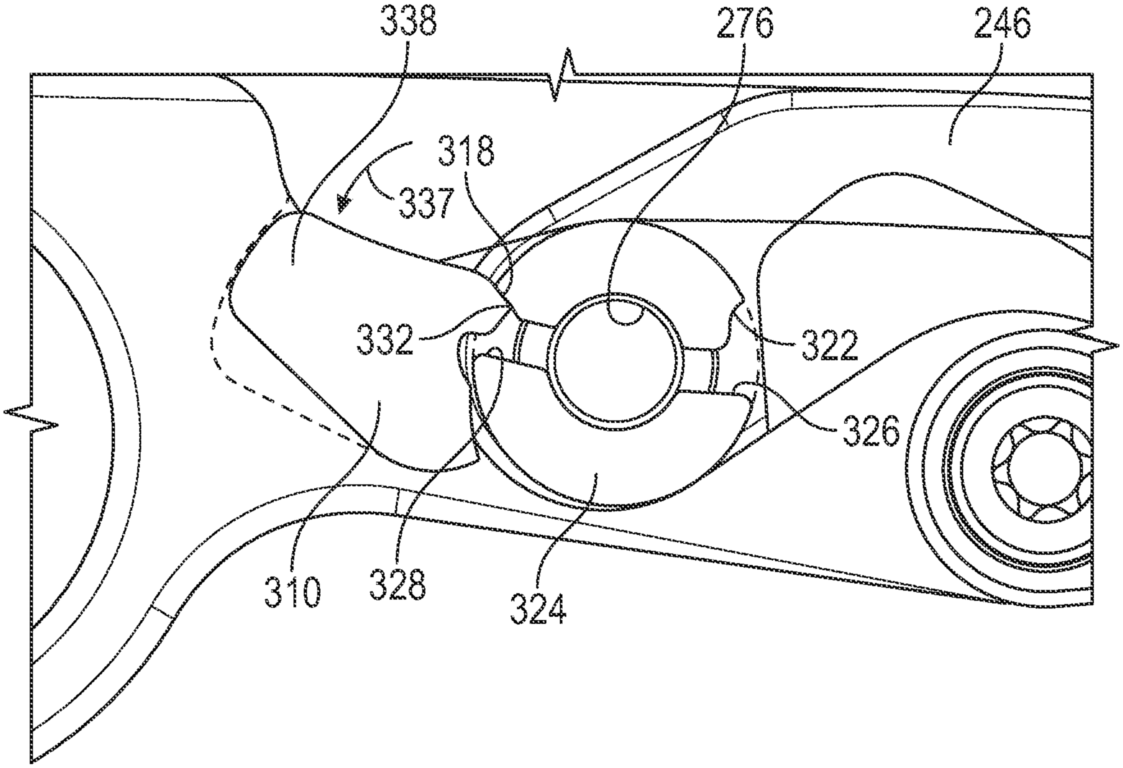
FIG. 15 is a side view of a portion of the folding knife of FIG. 7 in the use position.

Referring now to FIG. 15, when the blade 204 reaches the use position, the first engagement surface 318 of the locking member 310 becomes aligned with the cutout 328 and the biasing member 312 can bias the locking member 310 into the locked position such that the first engagement surface 318 engages the locking surface 332 of the projection 324. The engagement of the surfaces 318, 332 prevents movement of the linkage assembly 206 when an upward force (indicated by arrow 334 in FIG. 16) is applied to the linkage assembly 206. Furthermore, as mentioned above, and as shown in FIG. 16, the position of the distal end portion 250 of the first linkage element 246 within the recess 298 of the second linkage element 248 prevents movement of the linkage assembly 206 when a downward force (indicated by arrow 336) is applied to the linkage assembly 206. In other words, when the blade 204 is in the use position, the locking mechanism 208 can resist inadvertent movement of the linkage assembly 206 under "secondary loads," (e.g., loads applied to the linkage assembly at one or more locations proximal to the third pivot axis 278 and the pivot element **268*c*, that is, loads applied at one or more locations to the left of the pivot axis 278 and the pivot element 268*c* in FIG. 16**).

To move the blade and the linkage assembly from the use position to the storage position, a user can actuate the locking mechanism 208 (e.g., by rotating locking member 310) to move the locking mechanism 208 from the locked position to the unlocked position. For example, in the illustrated embodiment, a user can apply a downward force (indicated by arrow 337 in FIG. 15) to a proximal end portion 338 of the locking member 310 against the biasing force of the biasing member 312. Such a force can pivot the locking member 310 about the pivot axis 340. As the locking member 310 pivots, the first engagement surface 318 can slide relative to the locking surface 332 until the first engagement surface 318 and the locking surface 332 are no longer engaged. While maintaining pressure on the locking member 310, a user can then apply a closing force (e.g., an upward force as indicated by arrow 334 in FIG. 16) to the linkage assembly 206 to move the blade and the linkage assembly from the use position to the storage position. During the initial movement of the first linkage element 246 to the storage position, the cutout 328 rotates past the first engagement surface 318 of the locking member 310, at which point the user can release pressure on the locking member 310 while continuing to apply the closing force to the linkage assembly until the blade reaches the storage position.

As noted above, the locked position of the locking member 310 can be the same rotational position of the locking member as the detent position. For example, the cutouts 326, 328 in the projection 324 and/or the locking member 310 can be configured such that locking member 310 is at the same rotational position relative to the pivot axis 340 and the handle when the linkage assembly is in the closed position and the use position. To distinguish between the detent position and the locked position, the detent position can be referred to as a "detent state" in which the cam surface 330 of the projection 324 engages the locking member 310, and the locked position can be referred to as a "locked state" in which the locking surface 332 engages the locking member 310. Regardless of the exact rotational position of the locking member 310, the locking member can function as described above to resist movement of the first linking element 246 when the locking member is in the locked stated, and permit movement of the first linking element 246 when a user applies a force to the first linking sufficient to overcome the biasing force of the biasing member 312.

In other embodiments, the locking mechanism 208 can be any kind of locking element, for example, a liner lock (e.g., a leaf spring) configured to interact with the linkage assembly 206 to resist inadvertent movement of the linkage assembly when the blade is in the use position. In some embodiments wherein the locking mechanism is a liner lock, a user may apply a laterally-directed force to move the locking mechanism into the unlocked position. In some embodiments, the locking mechanism can be of the type disclosed in U.S. Publication No. 2018/0154531.

Figure 16:
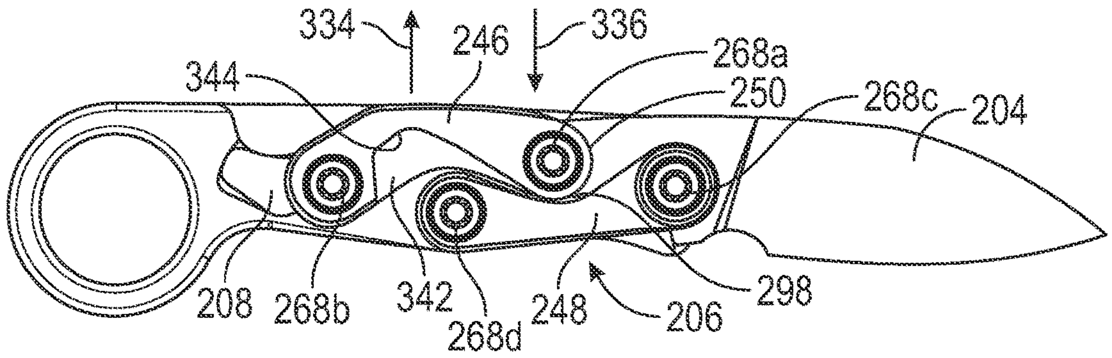
FIG. 16 is a side view of the folding knife of FIG. 7 in the use position.

In some embodiments, as shown in FIG. 16, the first linking element 246 can include a gripping recess 342 in the outer surface. A user can manipulate the first linking element 246, for example, by applying an upwardly-directed force (e.g., using a finger) to the upper edge 344 of the gripping recess 342. By manipulating the first liking element 246, the user can move the knife 200 from the use position to the storage position.

Figure 17:
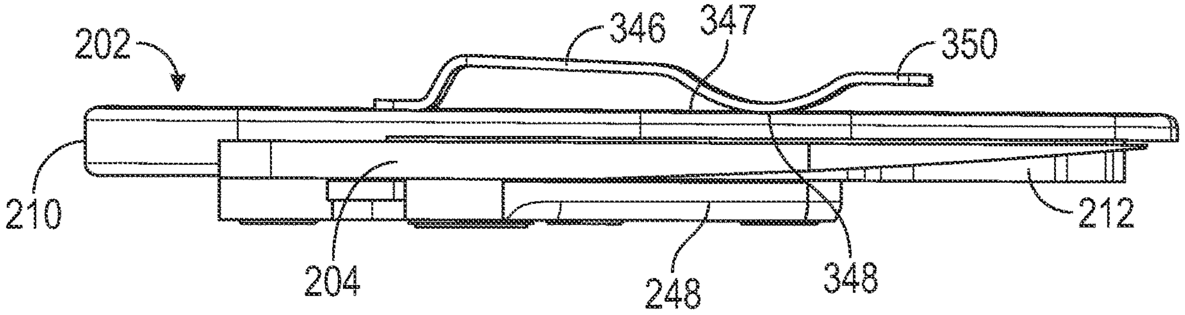
FIG. 17 is a top down view of the folding knife of FIG. 7 in the storage position.
Figure 18:
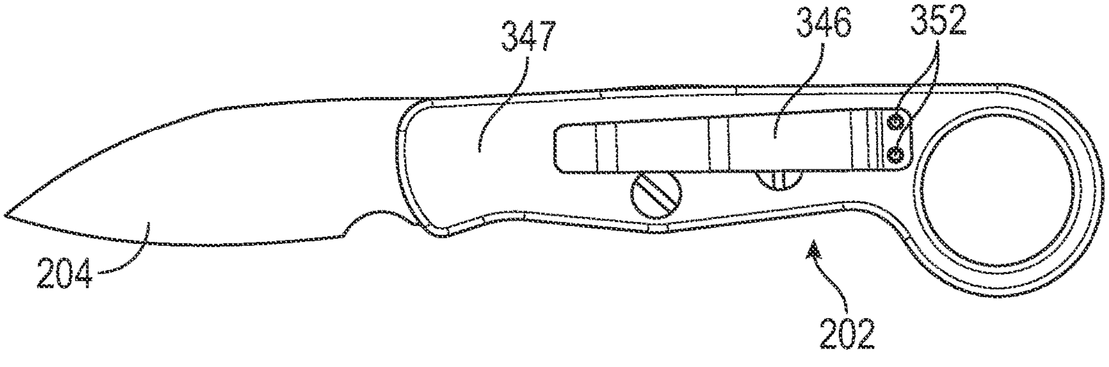
FIG. 18 is another side view of the folding knife of FIG. 7 in the use position.

Referring to FIGS. 17-18, in some embodiments, the knife 200 can additionally comprise a clip member 346. The clip member 346 can be configured to allow a user to clip the knife 200 to an article of clothing (e.g., pants, belt, etc.) and/or a carrying device (e.g., a bag, a tool belt pocket, etc.) and/or other object. As shown in FIG. 17, the clip member 346 can be biased toward the handle 202 such that a clip surface 348 of the clip member 346 engages a surface 347 of the handle 202. The clip member 346 can further comprise a free end portion 350 that can be actuated by a user (e.g., by applying a force to the free end portion in a direction away from the handle 202) to disengage the clip surface 348 from the handle 202.

The clip member 346 can be coupled to the sidewall 210 of the handle 202 on a surface opposite the protrusion 212. In some embodiments, the clip member 346 can be coupled to the sidewall 210 using one or more fasteners 352 (e.g., screws) as shown in FIG. 18. In other embodiments, the clip member 346 can be formed integrally with the sidewall 210.

Moreover, except where physically impossible, the knife 200 can include any of the various features described above in connection with the knife 100.

For example, in some embodiments, the first linking element 246 can further comprise an actuator (not shown) configured to be engaged by a user. The actuator can extend from, for example, the central portion or the distal portion of the first linking element 246 and can be a thumb stud, handle, lever, or other member configured to facilitate movement (e.g., upwards movement in the orientation shown in FIG. 16) of the first linking element 246 when the knife 200 is in the use position.

In other embodiments, the knife 200 can have first and second handle portions on opposite sides of the blade and the linking elements 246, 248. In such embodiments, the first linking element 246 can be disposed completely within the space between the first and second handle portions except for the actuator, which can extend laterally through a slot or opening in one of the handle portions or upwardly beyond the top margin of the handle for engagement with a digit of the user.

In another embodiment, the knife 200 need not include the locking mechanism 208. In some cases, a user's grip around one or both of the linking elements 246, 248 may be sufficient to resist inadvertent movement of the linkage assembly from the use position to the storage position. In another embodiment, the knife 200 can exclude the locking mechanism 208 and the first linking element 246 can have the configuration of the linking element 134 and can receive a pivot element 144 of the blade, as described above for the knife 100. In yet another embodiment, the knife 200 can include the locking mechanism 208 and the first linking element 246 can have the configuration of the linking element 134 and can receive a pivot element 144 of the blade, as described above for the knife 100.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein. As used herein, the term "and/or" used between the last two of a list of elements means any one or more of the listed elements. For example, the phrase "A, B, and/or C" means "A," "B," "C," "A and B," "A and C," "B and C," or "A, B, and C."

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, the term "proximal" refers to a position, direction, or portion of a device that is closer to the user and further away from the tip of the blade. As used herein, the term "distal" refers to a position, direction, or portion of a device that is further away from the user and closer to the tip of the blade. Thus, for example, proximal motion of a device is motion of the device toward the user, while distal motion of the device is motion of the device away from the user. The terms "longitudinal" and "axial" refer to an axis extending in the proximal and distal directions, unless otherwise expressly defined.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A folding knife, comprising:

a blade;

a handle comprising a side wall having a first side surface, an opposing, second side surface laterally spaced from the first side surface by a thickness of the side wall, the handle comprising a first end portion and a second end portion adjacent the blade when the blade is in a use position;

a protrusion extending laterally from the first side surface of the side wall, the protrusion having a side surface and an edge portion extending laterally from the first side surface of the side wall to the side surface of the protrusion, the edge portion comprising a first surface portion and a second surface portion, wherein the second surface portion is positioned closer to the second end portion of the handle than the first surface portion is and extends downwardly at a first angle relative to the first surface portion such that the second surface portion is not colinear with the first surface portion, wherein the second surface portion is configured as a locking surface;

the blade having a tang portion comprising a locking edge portion, the blade being translatable relative to the handle between a storage position and the use position;

a linkage assembly pivotably coupling the handle to the blade; and wherein when the blade is in the use position, the locking surface engages the locking edge portion of the tang to resist movement of the blade in a first direction; and wherein the edge portion of the protrusion further comprises a third surface portion extending from the first surface portion to the second surface portion, the third surface portion extending downwardly from the first surface portion at a second angle relative to the first surface portion, wherein the first angle is different than the second angle.

2. The folding knife of claim 1, further comprising a locking mechanism movable between a locked position and an unlocked position, wherein when in the locked position the locking mechanism is configured to engage the linkage assembly to retain the blade in the use position, wherein the locking mechanism is rotatable about a pivot axis extending through the locking mechanism, and wherein the handle comprises a ring-shaped portion at the first end portion, and wherein the pivot axis of the locking mechanism is positioned closer to the second end portion than the ring-shaped portion of the handle is.

3. The folding knife of claim 2, wherein the locking mechanism comprises a locking member and a biasing member configured to bias the locking member into the locked position.

4. The folding knife of claim 3, wherein the biasing member comprises a torsion spring.

5. The folding knife of claim 3, wherein the locking mechanism is further movable into and out of a detent position, and wherein when the locking mechanism is in the detent position and the blade is in the storage position, the blade can be manually moved to the use position by applying force above a predetermined threshold that exceeds a biasing force of the biasing member.

6. The folding knife of claim 1, wherein the edge portion of the protrusion comprises a slot and when the blade is in the storage position a cutting edge of the blade is at least partially disposed within the slot.

7. The folding knife of claim 1, wherein the linkage assembly comprises:

a first linking element having a first end portion and a second end portion, the first end portion being pivotably coupled to the tang portion at a first pivot axis and to the protrusion at a second pivot axis; and a second linking element having a first end portion and a second end portion, the first end portion being pivotably coupled to the tang portion at a third pivot axis and to the protrusion at a fourth pivot axis.

8. The folding knife of claim 1, wherein the tang portion comprises a projection and wherein the locking edge portion of the tang is disposed on a surface of the projection facing the handle.

9. The folding knife of claim 1, wherein when the blade is in the use position the locking edge portion of the tang is positioned closer to a tip of the blade than the locking surface is.

10. The folding knife of claim 1, wherein the first angle is less than the second angle.

11. The folding knife of claim 10, wherein the first, second, and third surface portions are flat.

12. The folding knife of claim 1, wherein when the blade is in the use position, the locking edge portion of the tang contacts the locking surface at a location at which the locking edge portion is forward of locking surface in a direction that extends from the first end portion of the handle to the second end portion of the handle.

13. A folding knife, comprising:

a handle comprising a side wall having a first side surface and an opposing, second side surface laterally spaced from the first side surface by a thickness of the side wall, wherein the handle further comprises a ring-shaped portion at a first end portion thereof and a second end portion;

a protrusion extending laterally from the first side surface of the side wall, the protrusion having a side surface and an edge portion extending laterally from the first side surface of the side wall to the side surface of the protrusion, the edge portion comprising a first surface portion, a second surface portion, and a third surface portion extending from the first surface portion to the second surface portion, wherein the second surface portion is positioned closer to the second end portion than the first surface portion is and extends downwardly at a first angle relative to the first surface portion, wherein the second surface portion is configured as a locking surface, and wherein the third surface portion extends downwardly at a second angle relative to the first surface, the second angle being different than the first angle, a blade having a tang portion comprising a locking edge portion, the blade being translatable relative to the handle between a storage position and a use position;

a linkage assembly pivotably coupling the handle to the blade, the linkage assembly including a first linking element being pivotably coupled to the tang portion at a first pivot axis and to the protrusion at a second pivot axis, and a second linking element being pivotably coupled to the tang portion at a third pivot axis and to the protrusion at a fourth pivot axis; and a locking mechanism comprising a locking member movable between an unlocked position and a locked position in which the locking member engages an annular projection disposed at least partially around the second pivot axis of the first linking element to resist pivoting of the linkage assembly when the blade in the use position, the annular projection comprising a first cutout defining a locking surface configured to engage an engagement surface of the locking member when the blade is in the use position to retain the blade in the use position and a second cutout radially opposite the first cutout defining a detent surface configured to engage a second engagement surface of the locking member when the blade is in the storage position;

wherein when the blade is in the use position, the locking surface engages the locking edge portion of the tang portion to resist movement of the blade in a first direction; and wherein the locking mechanism is rotatable about a fifth pivot axis that extends through the locking mechanism and the fifth pivot axis is disposed closer to the second end portion than the ring-shaped portion is.

14. The folding knife of claim 13, wherein the locking surface is positioned closer to the first end portion of the handle than the third pivot axis is and closer to the second end portion of the handle than the first pivot axis is when the blade is in the use position.

15. The folding knife of claim 13, wherein the blade comprises a first edge comprising a cutting edge and a second edge opposite the cutting edge, and wherein the first direction extends from the second edge towards the cutting edge and the engagement of the locking surface with the locking edge portion of the tang portion resists loads applied to the second edge of the blade in the first direction.

16. The folding knife of claim 13, wherein when the detent surface is engaged with the second engagement surface of the locking member, the blade can be manually moved to the use position by applying force above a predetermined threshold.

17. The folding knife of claim 9, wherein the protrusion comprises a first recess extending laterally into the protrusion and wherein the projection of the first linking element is disposed within the recess.

18. The folding knife of claim 13, wherein the edge portion of the protrusion comprises a slot and when the blade is in the storage position a cutting edge of the blade is at least partially disposed within the slot.

19. A folding knife, comprising:

a handle comprising a side wall having a first side surface and an opposing, second side surface laterally spaced from the first side surface by a thickness of the side wall, wherein the handle further comprises a ring-shaped portion at a first end portion thereof and a second end portion;

a protrusion extending laterally from the first side surface of the side wall, the protrusion having a side surface and an edge portion extending laterally from the first side surface of the side wall to the side surface of the protrusion, the edge portion comprising a first surface portion, a second surface portion, and a third surface portion extending from the first surface portion to the second surface portion, wherein the second surface portion is positioned closer to the second end portion than the first surface portion is and extends downwardly at a first angle relative to the first surface portion, wherein the second surface portion is configured as a locking surface, wherein the third surface portion extends downwardly from the first surface portion at a second angle, wherein the first angle is different from the second angle, and wherein the protrusion comprises a first recess extending laterally into the protrusion toward the side surface and a second recess disposed within the first recess and extending further laterally toward the side surface;

a blade having a tang portion comprising a locking edge portion, the blade being translatable relative to the handle between a storage position and a use position;

a linkage assembly pivotably coupling the handle to the blade; and a locking mechanism disposed within the first recess of the protrusion and comprising a locking member and a biasing member, the locking member being rotatable about an axis extending through the locking mechanism between a locked position, an unlocked position, and a detent position, the biasing member being disposed within the second recess of the protrusion;

wherein when the blade is in the use position, the locking surface engages the locking edge portion of the tang to resist movement of the blade in a first direction;

wherein an entirety of the locking mechanism including the biasing member is disposed closer to the second end portion than the ring-shaped portion is.

20. The folding knife of claim 19, wherein the second recess comprises a channel and wherein a first end portion of the biasing member is retained within the channel.

* * * * *